United States Patent [19]
Weder et al.

[11] Patent Number: 5,839,256
[45] Date of Patent: *Nov. 24, 1998

[54] CONVEYABLE COVER FORMER AND FASTENING SYSTEM

[75] Inventors: Donald E. Weder; Joseph G. Straeter, both of Highland, Ill.

[73] Assignee: Southpac Trust International, Inc.

[*] Notice: The term of this patent shall not extend beyond the expiration date of Pat. No. 5,450,707.

[21] Appl. No.: 826,841

[22] Filed: Apr. 7, 1997

Related U.S. Application Data

[63] Continuation of Ser. No. 465,294, Jun. 5, 1995, Pat. No. 5,661,952, which is a continuation of Ser. No. 88,976, Jul. 8, 1993, Pat. No. 5,450,707.

[51] Int. Cl.$^6$ ............................. B65B 11/18; B65B 49/00; B65B 51/00
[52] U.S. Cl. ............................. 53/399; 53/139.4; 53/209; 53/221; 53/414; 53/464
[58] Field of Search .......................... 53/399, 397, 139.4, 53/138.6, 414, 464, 583, 582, 590, 589, 209, 211

[56] References Cited

U.S. PATENT DOCUMENTS

| | | |
|---|---|---|
| 1,498,981 | 6/1924 | Ryder et al. |
| 2,148,587 | 2/1939 | Slocum ..................................... 53/464 |
| 2,165,840 | 7/1939 | Doble ....................................... 53/464 |
| 2,274,526 | 2/1942 | Bunn ........................................ 100/31 |
| 2,514,038 | 7/1950 | Doolittle ................................. 226/129 |
| 3,318,230 | 5/1967 | Hilton ........................................ 100/4 |
| 3,528,212 | 9/1970 | Jones ....................................... 53/464 |
| 3,974,762 | 8/1976 | Kita et al. .................................. 100/9 |
| 4,041,672 | 8/1977 | Gularte ........................................ 53/3 |
| 4,054,160 | 10/1977 | Knudsen ................................... 140/93 |
| 4,143,594 | 3/1979 | Falq ............................................ 100/7 |
| 4,362,096 | 12/1982 | Hanscom .................................. 100/10 |
| 4,401,020 | 8/1983 | Brux ............................................ 100/7 |
| 4,601,156 | 7/1986 | Parry et al. ............................... 53/399 |
| 5,105,599 | 4/1992 | Weder ....................................... 53/464 |
| 5,249,407 | 10/1993 | Stuck ........................................ 53/399 |

FOREIGN PATENT DOCUMENTS 0554520  8/1993  European Pat. Off. .

OTHER PUBLICATIONS

Rubber Band Technology, Ltd. Yakima, WA *Bandmaster 102 Model ET* (No Date).
Rubber Band Technology, Ltd. Yakima, WA *Bandmaster 102 Model AF* (No Date).
Strapack Inc. Tokyo, Japan, Sivaron S–661M & 661Y. ©1984.
Strapack Inc. Tokyo, Japan, Strapack Semiautomatic Strapping Machine S–660 ©1988 Strapack Corp.
Universal Strapping Corp *Uni–Pac Portable Strapping Kit* no date.
Cyklop Strapping Corp, Downingtown, PA Cyklop EM–15 (2 pgs) ©1987 Cyclop Strapping Corp.
Strapex Corp. Charlotte, NC How To Strap Without Getting In A Bind (2 pages, no date).
Cyklop Strapping Corp., Downgton, PA ASM Series (2 pgs) ©1988 Cyklop Strapping Corp.
Strapack Corp, Tokyo, Japan, StraPack Semi–Automatic Strapping Machine, Sivaron S–662 (2 pgs. no date).

(List continued on next page.)

*Primary Examiner*—James F. Coan
*Attorney, Agent, or Firm*—Dunlap & Codding, P.C.

[57] ABSTRACT

A method for forming a cover about an article from a sheet of material and for automatically fastening the cover to the article, and optionally, for automatically placing a label on the covered article. The sheet od material is formed into a cover about the article and a fastener is automatically positioned about a portion of the cover for fastening the cover about the article wherein the article having the cover formed about at least a portion of the outer peripheral surface of the article is moved to a fastening station of the fastening device. A labeling device may also be provided for automatically applying a label to the covered article.

21 Claims, 9 Drawing Sheets

OTHER PUBLICATIONS

Strapack Corp, Tokyo, Japan, *StraPack Semi–Automatic Polypropylene Strapping Mach., Sivaron SS–40* (2 pgs) (No Date).

Strapack Corp, Tokyo, Japan, *StraPack Semi–Automatic Strap.Mach., Sivaron S–661 S661L* (2 pgs. no date).

Universal Strapping Corp. Brooklyn Ny *Universal Strapping Strapping Semi–Automatic Plastic Strapping Machine* (2 pgs) (No Date).

Universal Strapping Corp, Brooklyn NY *Universal Strapping Extruders Of Plastic Strapping* (8 pgs no date).

Malow Corp., Mount Prospect, ILL, *Heavy Duty Tyer* 2 pgs No Date.

Highland Supply Corp, Highland, ILL *Speed Cover© The Original Pre–Formed Pot Cover*, 1984.

Rubber Band Technology, Ltd., Yakima, WA *BandMaster 101™ Model MF* (1 pg, no date).

Rubber Band Technology, Ltd., Yakima, WA *BandMaster™ 201 Model B* (No Date).

BH Bunn Co, Alsip, III, *Strapping Efficiency For Every Strapping Applications, #M20M–475* (6 pgs No date).

BH Bunn Co., Lakeland, FL, *Bunn Models 1691, 1991, 2091, 2491 & 3091 Tying Machines* ©1992 (3 pgs).

EAM Industries, W. Hazelton, PA *EAM Mosca Strapping System* (6 pgs, No date).

EAM Industries, W. Hazelton, PA *COM Taping Machine* (2 pgs, No date).

Clements Industries, Inc. S. Hackensack NJ *Tach–It Twisters, Packaging Machines, Bag Openers, Tape Winders* (No Date).

Clements Industries, Inc. S. Hackensack NJ *Tach–It Twisters, Model 3558*, 1 pg 1986.

InterPower Packaging, Hodgkins, IL *Akebono OB–300* 2 pgs No date.

InterPower Packaging, Hodgkins, IL *Power 260*, 2 pgs, 1991.

The John Henry Co., Cellocoup Brochure, 4 pgs, © 1991.

Saxmayer Corp., St. Blissfield, MI *Twine Tying Machines* 7 pgs, Date Unknown.

Saxmayer Corp. St. Blissfield, MI *Model 6 String Tyer*, 2 pgs Date Unknown.

Saxmayer Corp. St. Blissfield, MI *Model EM Route–Master* 2 pgs, Date Unknown.

Felins, Inc. Milwaukee, WS *Pak–Tyer 2000* 4 pgs, no date.

Klerk's Plastic Products Mfg. Inc. *A World of Cut Flowers And Plant Pot Packaging* Date Unknown, 6 pgs.

*Color Them Happy With Highlander Products,*©1992, 1 page.

"Super Seller", Supermark Floral, Sep. 15, 1992. 2 pgs.

"Costa Keeps The Christmas Spirit", Supermarket Floral Sep. 15, 1992.

"Now, More Than Ever", Supermarket Floral, Sep. 15, 1992.

"Halloween", Link Magazine, Sep. 1992, 2 pgs.

"Speed Sheets© And Speed Rolls", Highland Supply Speed Sheets© Brochure, 1990, 2 pgs.

Olimex Brochure, 6 pages, Date Unknown.

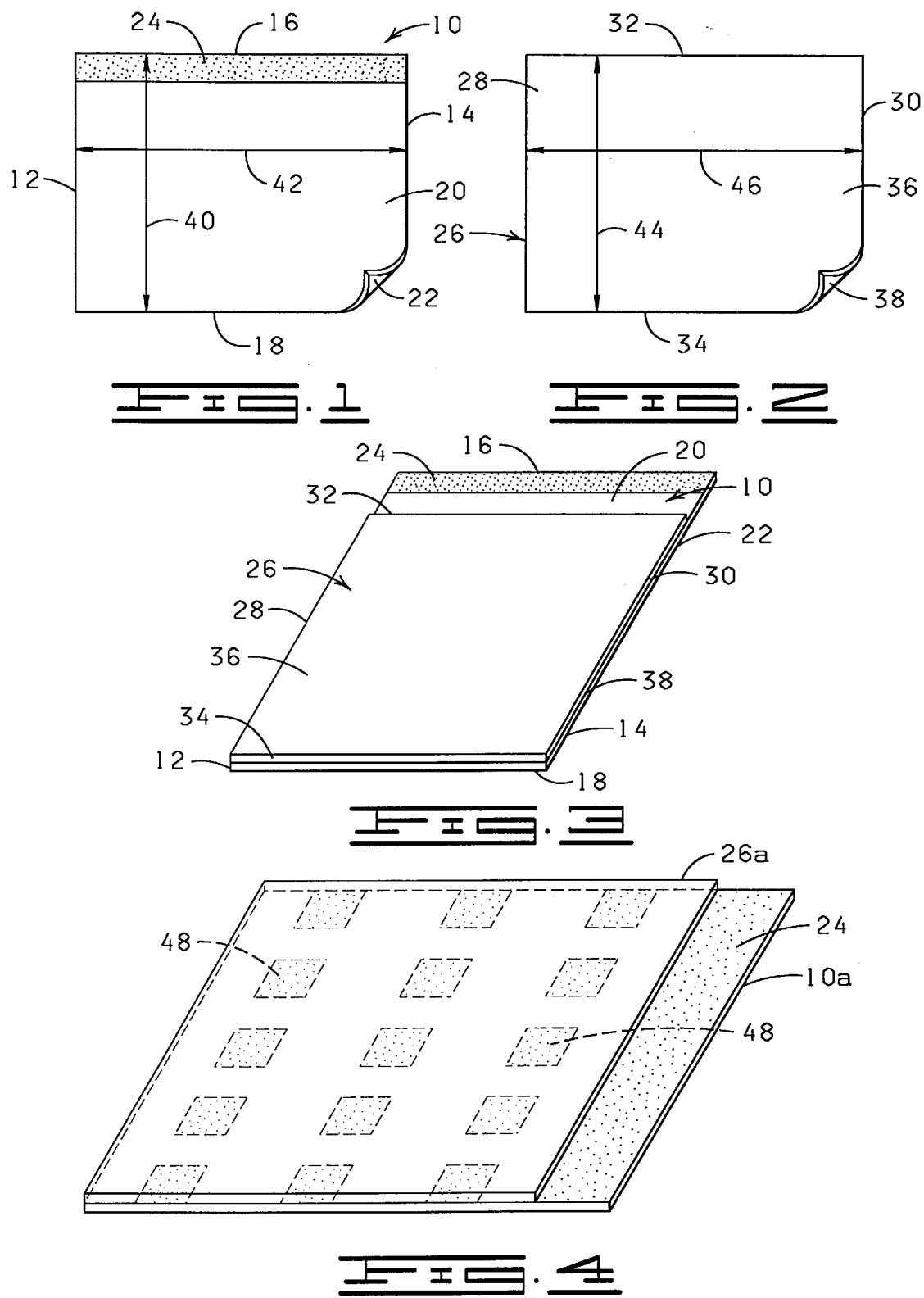

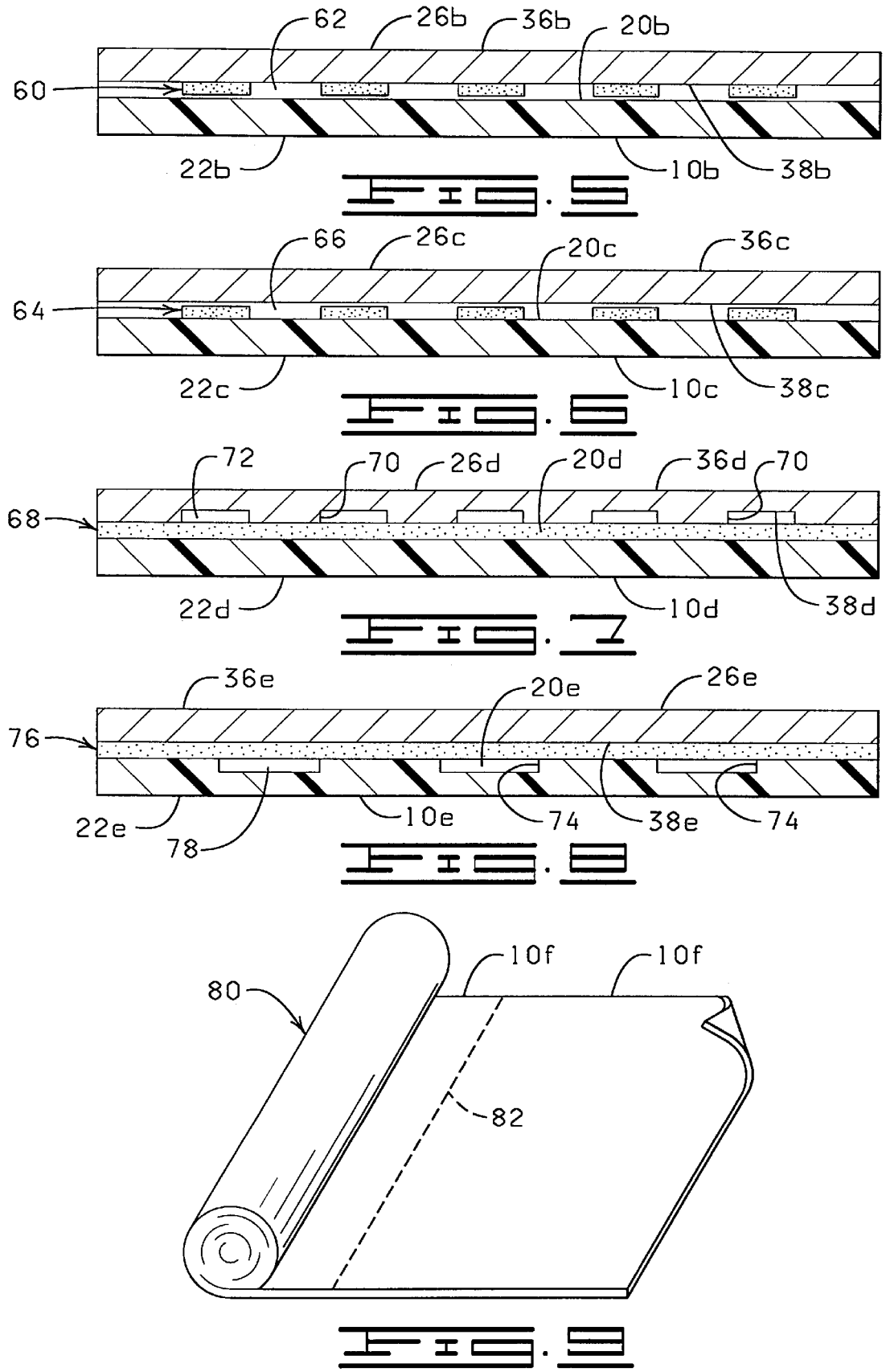

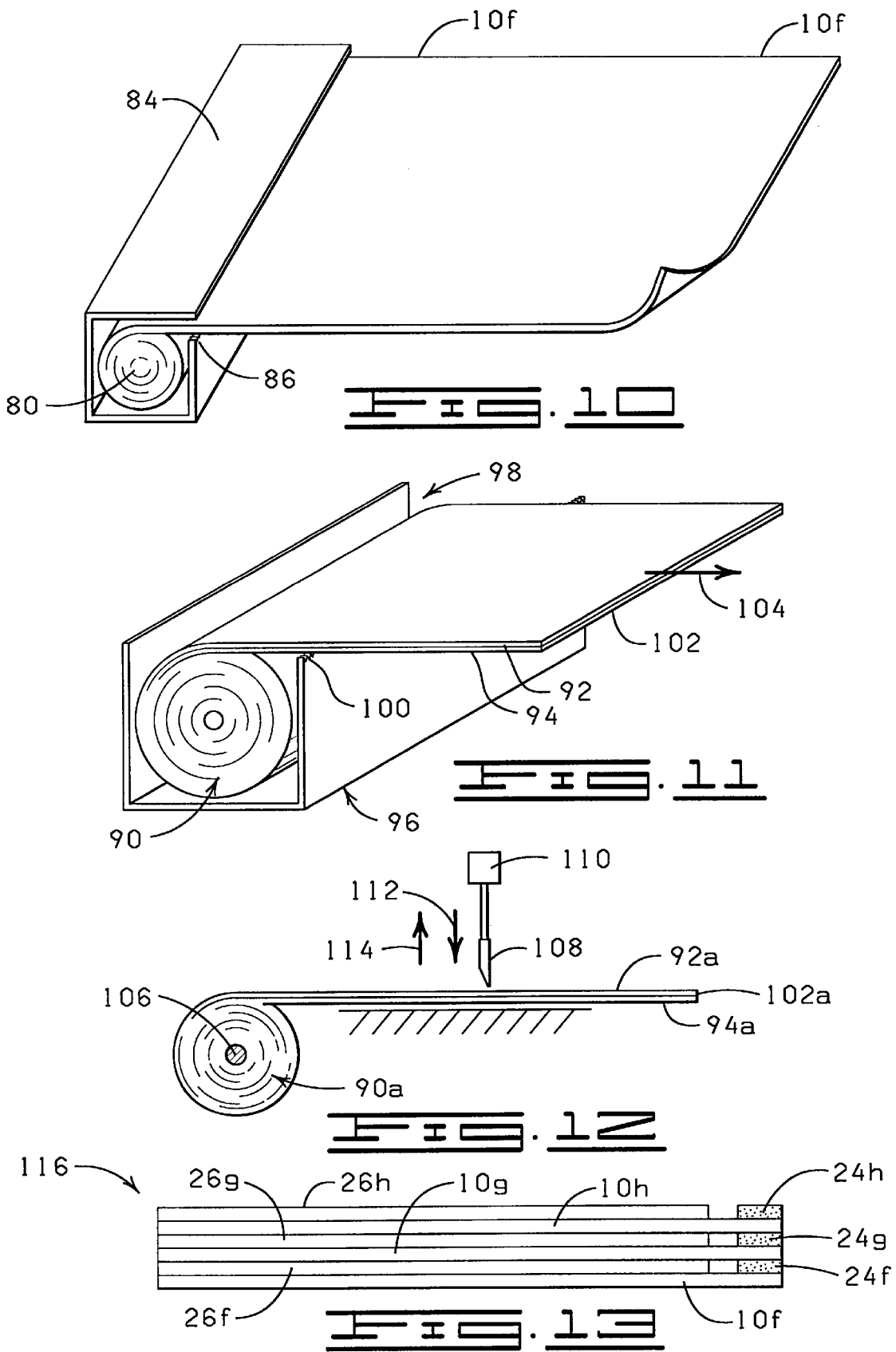

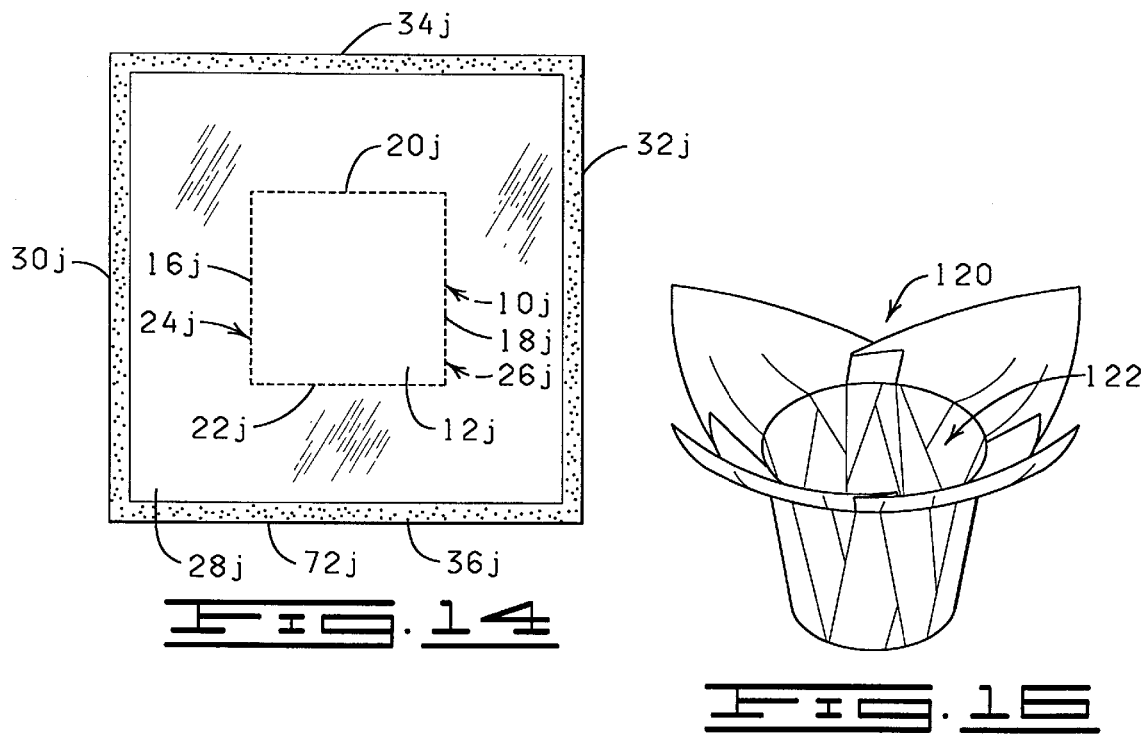
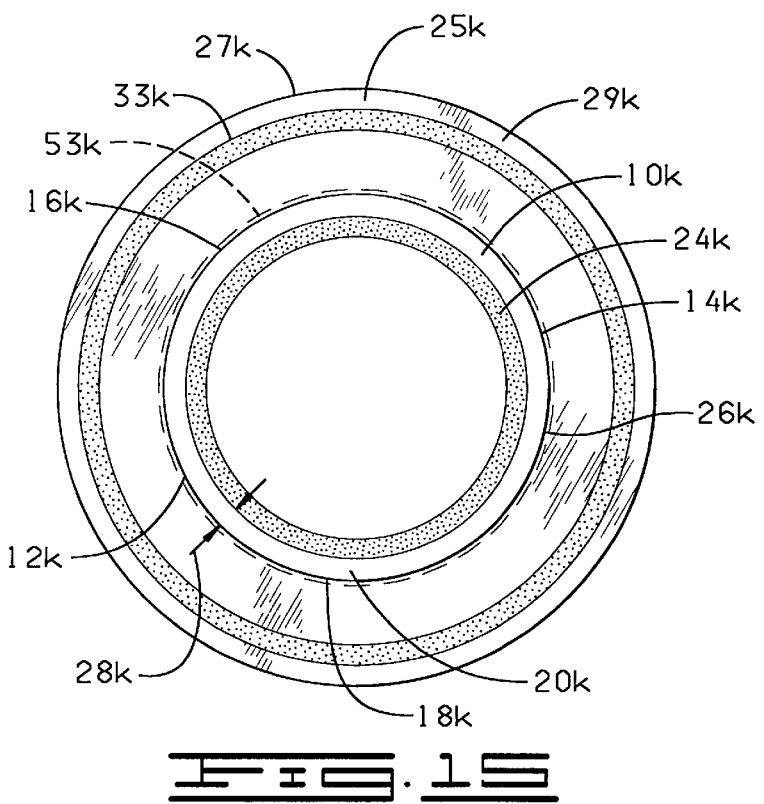

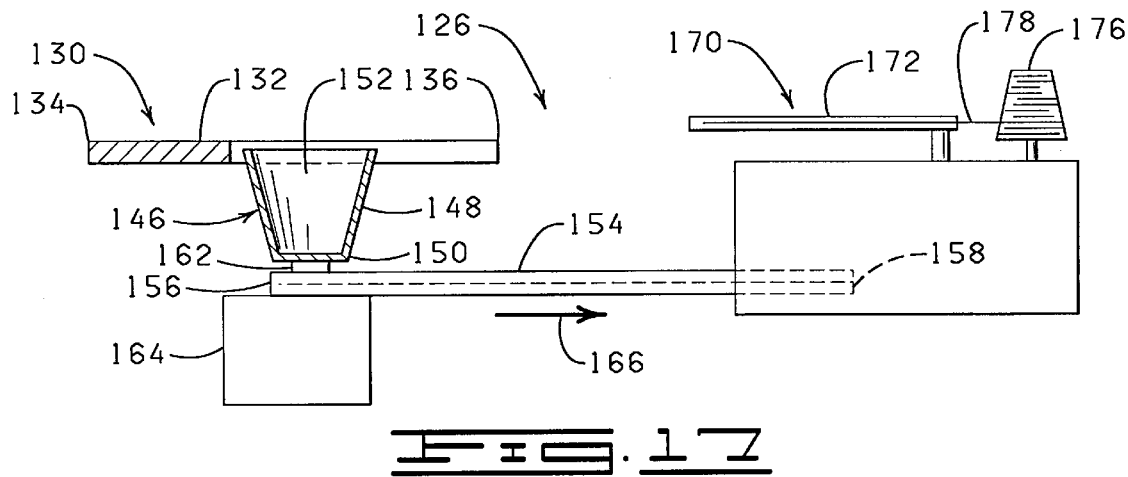
Fig. 17
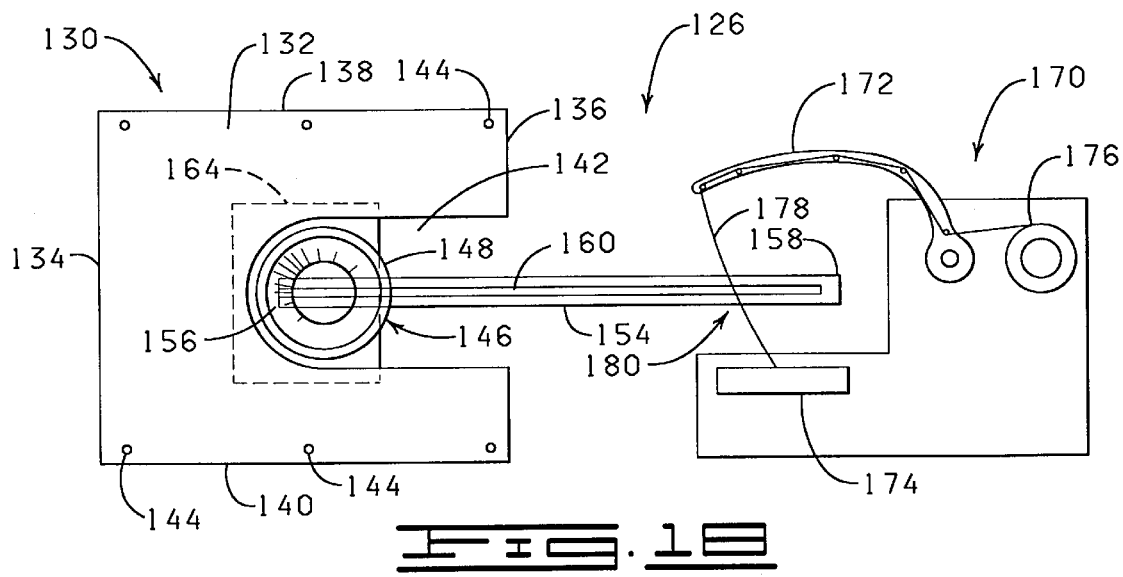
Fig. 18
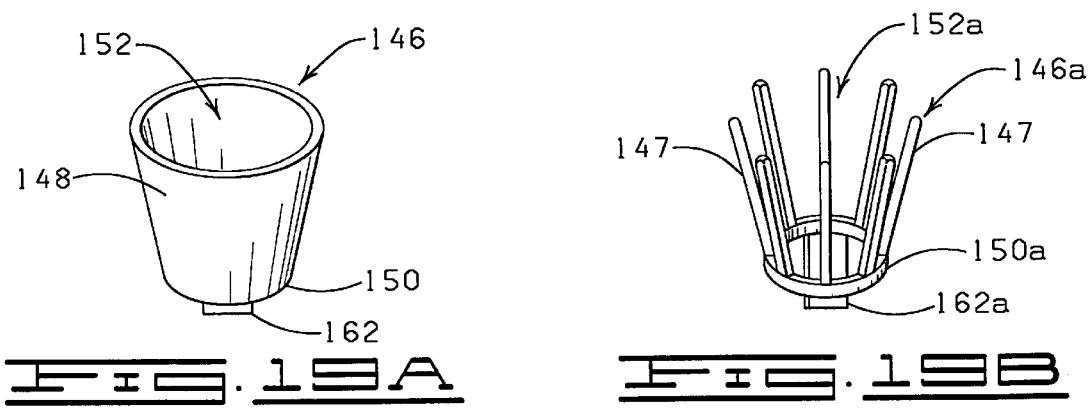
Fig. 19A
Fig. 19B

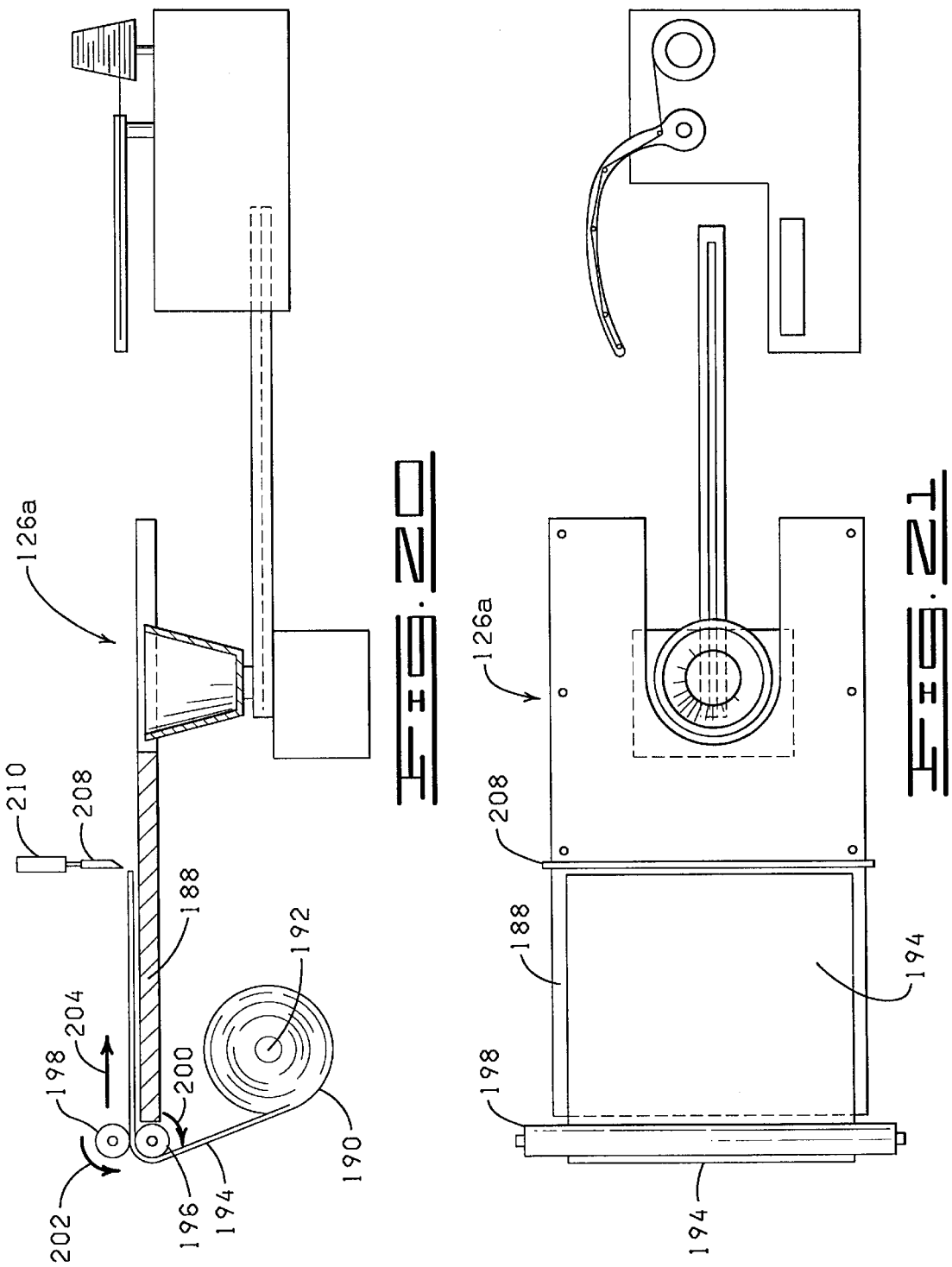

CONVEYABLE COVER FORMER AND FASTENING SYSTEM

CROSS-REFERENCE TO RELATED APPLICATIONS

This application is a continuation of application U.S. Ser. No. 08/465,294, filed Jun. 5, 1995, now U.S. Pat. No. 5,661,952, entitled CONVEYABLE COVER FORMER AND FASTENING SYSTEM; which is a continuation of U.S. Ser. No. 08/088/976, filed Jul. 8, 1993, entitled CONVEYABLE COVER FORMER AND FASTENING SYSTEM, now U.S. Pat No. 5,450,707.

BACKGROUND

The present invention relates to an apparatus and method for using a conveyable cover former for placing a cover about an article, conveying the covered article to a fastening device, and automatically applying a fastener about the covered article, and more particularly, but not by way of limitation, to such apparatus and methods wherein the article. is a potted plant or flower pot.

SUMMARY

The present invention is directed to an apparatus and method for forming a cover about an article, conveying the article and to cover to a fastening device and automatically fastening the cover to the article, and optionally for automatically placing a label on the covered article. The article may be an article such as a potted plant or flower pot and the cover may be a decorative cover. The invention satisfies the need for rapidly covering and fastening the cover about an article with a minimal amount of manual effort and in a location having a limited amount of available space.

The apparatus comprises a platform having a support surface formed thereon. An opening sized to accommodate an article for passage therethrough extends through the support surface. The support surface is adapted to support at least portions of a sheet of material in a position generally over a conveyable cover forming assembly or mold disposed near the opening in the support surface. The conveyable cover forming assembly or mold has contacting portions for contacting the sheet of material. The conveyable cover forming assembly or mold opening is sized and configured to receive the article.

The apparatus further comprises a fastening or tying device for automatically applying a fastener about a portion of the outer surface of the covered article for fastening the cover about the article after the cover is formed about the article.

The apparatus further comprises conveying assembly or rail for conveying the covered article and conveyable cover forming assembly or mold from the cover forming position to a fastener application position at the fastening or tying device.

The apparatus may also comprise a labeling device for automatically applying a label to a portion of the outer surface of the cover of the covered article. The apparatus may further comprise an assembly for automatically placing a sheet of material on the support surface.

The present invention also comprises a method for processing an article. The process initially comprises providing a platform having a support surface formed thereon and an opening extending through the support surface. The opening is as described above. The conveyable cover forming assembly or mold has contacting portions and is sized to receive an article, which may be a flower pot. The next step is placing a sheet of material in a cover forming position over the opening and on the support surface wherein the sheet of material, in the cover forming position, is positioned over the conveyable cover forming assembly or mold.

The next step is providing the article and positioning the article in a position over the sheet of material so the article is disposed generally above and near the portion of the sheet of material which is above the conveyable cover forming assembly or mold. Then, the article is moved in a direction which causes the lower end of the article to engage a portion of the sheet of material. The article and portions of the sheet of material pass into the conveyable cover forming assembly or mold causing the sheet of material to contact or nearly contact both the outer peripheral surface of the article and the contacting portions of the conveyable cover forming assembly. The sheet is pressed about the outer peripheral surface of the article to form a cover about the article.

The conveyable cover forming assembly or mold is automatically conveyed on a conveying assembly such as a rail so that the covered article is moved into a fastener applicating position at the fastening device. After the covered article is conveyed to the fastener applicating position a fastener is automatically applied about a portion of the outer surface of the cover of the article for fastening the cover about the article. Then the covered article is removed from the conveyable cover forming assembly. The covered article may be removed before or after the conveyable cover forming assembly is returned via the conveying assembly to near the platform. Also, the method may comprise the additional step of engaging an automatic labeling means and automatically applying a label to a portion of the outer surface of the cover of the article prior to the removal of the covered article.

DESCRIPTION OF THE DRAWINGS

FIG. 1 is a plan view of a first sheet of material with one end turned up and constructed in accordance with the present invention.

FIG. 2 is a plan view of a second sheet of material with one end turned up and constructed in accordance with the present invention.

FIG. 3 is a perspective view showing the first and the second sheets of material disposed adjacent each other.

FIG. 4 is a perspective view showing bonding areas on the surface of a first sheet or a second sheet which cause bonding of the second sheet and the first sheet.

FIG. 5 is a cross sectional view of a modified first and second sheets of material.

FIG. 6 is another cross-sectional view of a modified first sheet of material connected to a modified second sheet of material.

FIG. 7 is a cross sectional view of still another modified first sheet of material connected to a modified second sheet of material.

FIG. 8 is another cross-sectional view of yet another modified first sheet of material connected to a modified second sheet of material.

FIG. 9 is a diagrammatic view of a plurality of sheets of material, constructed in accordance with the present invention forming a continuous roll, the roll partially unrolled to reveal a single sheet still attached thereto.

FIG. 10 is a diagrammatic view of a plurality of sheets of material forming a continuous roll of material disposed in a dispenser.

FIG. 11 is a diagrammatic view showing a roll of material wherein the roll of material comprises a first and a second sheet of material constructed in accordance with the present invention disposed in a dispenser (diagrammatically shown in FIG. 11) for dispensing the first and the second sheets of material from the roll of material.

FIG. 12 is a diagrammatic view of a roll of material for dispensing a first and a second sheet of material constructed in accordance with the present invention from the roll of material.

FIG. 13 is a side elevational view of a pad of first and second sheets of material constructed in accordance with the present invention.

FIG. 14 is a plan view of a sheet of material with a sheet extension connected thereto constructed in accordance with the present invention.

FIG. 15 is a plan view showing the upper surface of another sheet of material with a sheet extension connected thereto constructed in accordance with the present invention.

FIG. 16 is a perspective view of a pre-formed decorative pot cover.

FIG. 17 is a side elevational view of a tying assembly of the present invention.

FIG. 18 is a plan view of the tying assembly of FIG. 17.

FIG. 19A is a perspective view of a cover forming mold of FIG. 17.

FIG. 19B is a perspective view of another version of a cover forming mold of FIG. 17.

FIG. 20 is a side elevational view of a version of the present invention having a material dispenser.

FIG. 21 is a plan view of the version of the present invention shown in FIG. 20.

DESCRIPTION

Figure 22A:
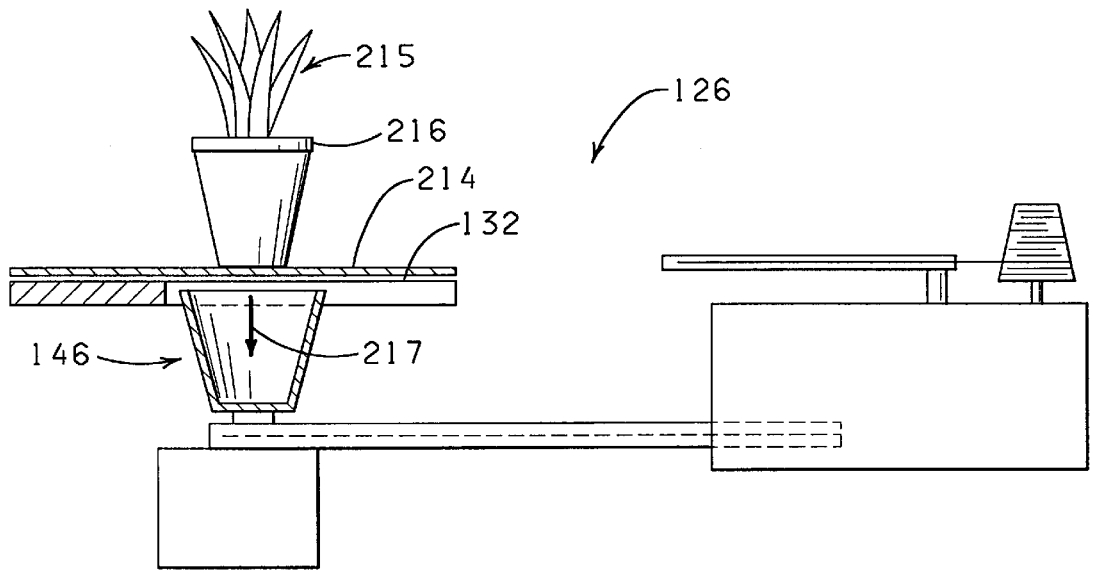
FIG. 22A–22D are side elevational views of the apparatus of FIG. 17 while in operation.

In one version, the present invention comprises an apparatus for processing an article such as a potted plant or flower pot. The apparatus comprises a platform supported by a framework. The platform has a support surface formed thereon and an opening extending through the support surface. The opening is sized to accommodate an article to be passed therethrough. The article has. an upper end, a lower end, and an outer peripheral surface.

The apparatus further comprises a conveyable cover forming assembly having contacting portions and a receiving end and sized to receive the article. The cover forming assembly is further adapted such that the sheet of material is formed into a cover about the outer peripheral surface of the article when the article is moved in a direction which causes the lower end of the article to engage a portion of the sheet of material. As the sheet is engaged, the article and portions of the sheet of material pass into the receiving end of the conveyable cover forming assembly causing the sheet of material to contact or nearly contact both the outer peripheral surface of the article and the contacting portions of the conveyable cover forming assembly. As the article is moved the sheet is pressed about the outer peripheral surface of the article to form the cover about the article. The cover has an inner surface facing the outer peripheral surface of the article and an exposed outer surface.

The apparatus further comprises a conveying assembly for conveying the conveyable cover forming assembly from adjacent the platform to a fastener applicating position. The apparatus further comprises a fastener applicating device such as a tying device for automatically applying a fastener about a portion of the outer surface of the cover of the article for fastening the cover about the article when the conveyable cover forming assembly is conveyed via the conveying assembly to the fastener applicating position.

Finally, the apparatus comprises a drive assembly for conveying the conveyable cover forming assembly via the conveying assembly to the fastener applicating position adjacent the fastener applicating device and for returning the conveyable cover forming assembly via the conveying assembly to a cover forming position adjacent the platform. Optionally, the apparatus may further comprises a labeling device for automatically applying a label to a portion of the outer surface of the cover of the covered article.

The present invention, as will be understood by one of ordinary skill in the art, may also be modified such that the tying machine is conveyable to a stationary cover forming apparatus.

The present invention further comprises a method using the apparatus described above for processing an article such as a potted plant or flower pot. The method comprises the first step of providing a platform having a support surface formed thereon and an opening extending through the support surface in which the opening is sized to accommodate an article passed therethrough. In the next step, a conveyable cover forming assembly is provided, such as described above, which is conveyable via a conveying assembly such as a rail.

Next, a sheet of material is placed in a cover forming position over the opening and on the support surface wherein the sheet of material, in the cover forming position, is positioned over the receiving end of the conveyable cover forming assembly. An article, for example a potted plant or flower pot, is provided. The article is positioned in a position over the sheet of material and in a position wherein the lower end of the article is disposed generally above and near the portion of the sheet of material which is above the receiving end of the conveyable cover forming assembly.

The sheet of material is formed into a cover about the outer peripheral surface of the article by moving the article in a direction which causes the lower end of the article to engage a portion of the sheet of material whereby the article and portions of the sheet of material pass into the receiving end of the conveyable cover forming assembly causing the sheet of material to contact or nearly contact both the outer peripheral surface of the article and the contacting portions of the. conveyable cover forming assembly as the article is moved. The sheet is pressed about the outer peripheral surface of the article to form the cover about the article.

A fastener applicating device such as a tying device is provided. The conveyable cover forming assembly is conveyed via the conveying assembly from adjacent the platform to a fastening position adjacent the fastener applicating device. A fastener is automatically applied about a portion of the outer surface of the cover of the article for fastening the cover about the article. The article with the cover fastened thereabout is then removed.

The Embodiments of FIGS. 1–3

Shown in FIG. 1 and designated therein by the general reference numeral 10 is a sheet of material. The sheet of material 10 has a first end 12, a second end 14, a first side 16, a second side 18, an upper surface 20 and a lower surface 22.

A closure bonding material 24 may be disposed on the upper surface 20 of the sheet of material; alternatively, the sheet of material 10 may be free of a closure bonding material. As shown in FIG. 1, the closure bonding material 24, if present, may be disposed adjacent the first side 16 of the sheet of material 10 and extends between the first and the second ends 12 and 14 of the sheet of material 10 or it may be disposed on any other portion of the sheet of material 10. As shown in FIG. 1, the closure bonding material 24. is disposed on the upper surface 20 in a strip of closure bonding material 24, although the closure bonding material 24 also could be applied to the upper surface 20 of the sheet of material 10 in the form of spaced apart spots or the closure bonding material 24 also could be disposed on the upper surface 20 of the sheet of material 10 in any other geometric form and in any pattern including covering the entire upper surface 20 of the sheet of material 10. In this last-mentioned instance, the closure bonding material and the connecting bonding material would be contained within the bonding material covering the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a square or rectangular shape is shown in FIG. 1 only by way of example. The sheet of material 10, for example only, may be square, rectangular, circular or any other geometric shape such as heart shaped, for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a plant or flower pot, as described herein. The layers of material comprising the sheet of material 10 may be connected together or laminated or may be separate layers.

Shown in FIG. 2 is a second sheet of material 26. The second sheet of material 26 has a first end 28, a second end 30, a first side 32, a second side 34, an upper surface 36 and a lower surface 38. The second sheet of material 26, if used, may be constructed of paper. The term "paper" as used herein means treated or untreated paper, corrugated paper or cardboard or any other form of paper material.

The first sheet of material 10 has a length 40 extending between the first and the second sides 16 and 18 of the sheet of material 10. The first sheet of material 10 also has a width 42 extending between the first and the second ends 12 and 14 of the first sheet of material 10.

The second sheet of material 26 has a length 44 extending between the first and the second sides 32 and 34 of the second sheet of material 26. The second sheet of material 26 has a width 46 extending between the first and the second ends 28 and 30 of the second sheet of material 26. In a preferred embodiment, the length 44 of the second sheet of material 26 is less than the length 40 of the first sheet of material 10 as shown in FIG. 3 so that, when the first sheet of material 10 is disposed adjacent the second sheet of material 26, a portion of the first sheet of material 10 adjacent the first side 16 thereof extends a distance beyond the first side 32 of the second sheet of material 26, in a manner and for reason which will be described in greater detail below.

The first sheet of material has a thickness in a range from about 0.5 mils to about 30 mils and preferably the thickness of the first sheet of material is in a range from about 0.5 mils to about 10 mils. The first sheet of material 10 is constructed of a material which is flexible.

The second sheet of material 26 has a thickness in a range from about 0.1 mils to about 30 mils and preferably in a range from about 0.1 mils to about 10 mils. The second sheet of material 26 is flexible, but relatively rigid compared to the first sheet of material 10.

The second sheet of material 26 may be any shape and a square or rectangular shape is shown in FIG. 2 only by way of example. The second sheet of material for example only may be square, rectangular, circular or any other geometric shape.

The second sheet of material 26 may be constructed of a single layer of material or a plurality of layers of the same or different types of materials. Any thickness of the second sheet of material 26 may be utilized in accordance with the present invention as long as the second sheet of material 26 is wrappable about an object such as a flower pot, as described herein, and as long as the second sheet of material 26 provides the rigidity described herein or the absorbency described herein or both. The layers of material comprising the second sheet of material 26 may be connected together or laminated or may be separate layers.

In operation, when a second sheet of material 26 is desired in addition to the first sheet of material 10, the second sheet of material 26 is placed adjacent the first sheet of material 10 as shown in FIG. 3. In this position, the lower surface 38 of the second sheet of material 26 is disposed adjacent the upper surface 20 of the first sheet of material 10. The width 42 of the first sheet of material 10 is about equal to the width 46 of the second sheet of material 26 so that, when the first and the second sheets of material 10 and 26 are disposed adjacent each other, the first end 28 of the second sheet of material is generally aligned with the first end 12 of the first sheet of material 10, the second end 30 of the second sheet of material 26 is generally aligned with the second end 14 of the first sheet of material 10, the second side 18 of the first sheet of material 10 is generally aligned with the second side 34 of the second sheet of material and the first side. 16 of the first sheet of material 10 extends a distance beyond the first side 32 of the second sheet of material 26 so that the closure bonding material 24 on the upper surface 20 of the first sheet of material 10 is exposed and not covered by the second sheet of material 26.

It should be noted that the first and the second sheets of material 10 and 26 each could have virtually identical lengths 40 and 44. In this case, the second sheet of material 26 is disposed on the first sheet of material 20 in such a manner that the second side 34 of the second sheet of material 26 extends a distance beyond the second side 18 of the first sheet of material 10 whereby the first side 16 of the first sheet of material 10 is spaced a distance from the first side 32 of the second sheet of material 26 thereby leaving the closure bonding material 24 on the first sheet of material 10 exposed and not covered by the second sheet of material 26. Multiple sheets of material 10 and 26 may be used. Moreover, when multiple sheets of material 10 and 26 are used in combination, the sheets of material 10 and 26 need not be uniform in size or shape. Finally, it will be appreciated that the sheets of material 10 and 26 shown in all embodiments herein are substantially flat.

As noted earlier, a closure bonding material may be disposed on the upper surface of the first sheet of material 10. The closure bonding material 24 may be applied as a strip or as spots or other shapes. One method for disposing a closure bonding material, in this case an adhesive, is described in U.S. Pat. No. 5,111,637 entitled "Method For Wrapping A Floral Grouping" issued to Weder et al., on May 12, 1992 and which is hereby incorporated herein by reference.

The first sheet of material 10 can be utilized alone or in combination with the second sheet of material 26 to wrap a potted plant or flower pot. The term "flower pot" refers to any type of container used for holding a floral grouping or a potted plant. Examples of flower pots used in accordance with the present invention are clay pots, plastic pots, and the like. "Floral grouping" as used herein means cut fresh flowers, artificial flowers, a single flower, other fresh and/or artificial plants or other floral materials, and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The first sheet of material 10 or the second sheet of material 26 may be constructed of a single layer of material or a plurality of layers of the same or different types of materials. Any thickness of the sheet of material 10 or 26 may be utilized in accordance with the present invention as long as the sheet of material 10 or 26 may be wrapped or formed about at least a portion of a flower pot, as described herein. Additionally, an insulating material such as bubble film, preferable as one of two or more layers, can be utilized in order to provide additional protection for the item wrapped therein.

In a preferred embodiment, the first sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 10 may be connected together or laminated or may be separate layers.

The sheet of material 10 is constructed from any suitable wrapping material that is capable of being wrapped about a flower pot or floral grouping, as the case may be. Preferably, the wrapping material 10 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or 26 may vary in color. Further, the sheet of material 10 or 26 may consist of designs or decorative patterns which are printed, etched, and/or embossed thereon using inks or other printing materials. An example of an ink which may be applied to the surface of the sheet of material 10 or 26 is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, the sheet of material 10 or 26 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or 26. Moreover, each surface of the sheet of material 10 or 26 may vary in the combination of such characteristics. The sheet of material 10 or 26 itself may be opaque, translucent or partially clear or tinted transparent.

Embodiments of FIGS. 4–8

Referring now to FIG. 4, a bonding material may be applied to either the upper surface of a first sheet of material 10a or to the lower surface of a second sheet material of 26a in a plurality of patches 48 for the purpose of bonding the upper surface of the first sheet 10a to the lower surface of the second sheet 26a.

Shown in FIG. 5 is a modified first sheet of material 10b connected to a modified second sheet of material 26b. The first sheet of material 10b is constructed exactly like the sheet of material 10. The second sheet of material 26b is constructed like the sheet of material 26 described in detail before and shown in. FIG. 2, except the second sheet of material 26b includes a bonding material 60 disposed on the lower surface 38b of the second sheet of material 26b. The bonding material 60 is in the form of a plurality of spaced apart spots of bonding material 60, similar to that shown in FIG. 4. The lower surface 38b of the second sheet of material 26b is bondingly connected to the upper surface 20b of the first sheet of material 10b by way of the bonding material 60. Since the bonding material 60 is in the form of a plurality of spaced apart spots, a plurality of spaced apart spaces 62 (only one of the spaces 62 being designated by reference numeral in FIG. 5) are formed between the lower surface 38b of the second sheet of material 26b and the upper surface 20b of the first sheet of material 10b. The spaces 62 provide air gaps which form an insulation when the first and the second sheets of material 10b and 26b are wrapped about a flower pot in a manner and for reasons like that described herein.

Shown in FIG. 6 is a modified first sheet of material 10c connected to a modified second sheet of material 26c. The first sheet of material 10c is constructed exactly like the sheet of material 10 shown in FIG. 1, except the first sheet of material 10c includes a bonding material 64 disposed on the upper surface 20c of the first sheet of material 10c. The bonding material 64 is in the form of a plurality of spaced apart spots of bonding material 64, similar to that shown in FIG. 5. The lower surface 38c of the second sheet of material 26c is bondingly connected to the upper surface 20c of the first sheet of material 10c by way of the bonding material 64. Since the bonding material 64 is in the form of a plurality of spaced apart spots, a plurality of spaces 66 (only one of the spaces 66 being designated by a reference numeral in FIG. 6) are formed between the lower surface 38c of the second sheet of material 26c and the upper surface 20c of the first sheet of material 10c. The spaces 66 provide air gaps which form an insulation when the first and the second sheets of material 10c and 26c are wrapped about a flower pot in a manner and for reasons like that described herein in connection with FIG. 5.

Shown in FIG. 7 is a modified first sheet of material 10d connected to a modified second sheet of material 26d. The first sheet of material 10d is constructed exactly like the sheet of material 10 shown in FIG. 1, except the first sheet of material 10d includes a bonding material 68 on the upper surface 20d thereof. The second sheet of material 26d is constructed exactly like the second sheet of material 26 shown in FIG. 2, except the second sheet of material 26d includes a plurality of spaced apart raised portions 70. The raised portions 70 may be formed by embossing the second sheet of material 26d or forming corrugations in the second sheet of material 26d or in any other manner desired in any particular application.

The upper surface 20d of the first sheet of material 10d is disposed generally adjacent the lower surface 38d of the second sheet of material 26d or, more particularly, adjacent the raised portions 70 on the second sheet of material 26d. In this position, the raised portions 70 are bonded to the upper surface 20d of the first sheet of material 10d by way of the bonding material 68 to connect the first sheet of material 10d to the second sheet of material 26d.

The spaced apart raised portions 70 on the second sheet of material 26d form a plurality of spaces 72 between the first sheet of material 10d and the second sheet of material 26d in a connected position of the first and the second sheets of material 10d and 26d for providing insulation when the first and second sheets of material 10d and 26d are connected together and wrapped about a flower pot in a manner like that described herein.

Shown in FIG. 8 is a modified first sheet of material 10e connected to a modified second sheet of material 26e. The first sheet of material 10e is constructed exactly like the sheet of material 10 shown in FIG. 1, except the first sheet of material 10e includes a plurality of spaced apart raised portions 74. The raised portions 74 may be formed in the first sheet of material 10e by embossing the first sheet of material 10e or forming corrugations in the first sheet of material 10e or in any other suitable manner. The second sheet of material 26e is constructed exactly like the second sheet of material 26 shown in FIG. 2, except the second sheet of material 26e includes a bonding material 76 disposed on the lower surface 38e thereof.

In operation, the upper surface 20e of the first sheet of material 10e is disposed generally adjacent the lower surface 38e of the second sheet of material 26e or, more particularly, the raised portions 74 on the first sheet of material 10e are disposed. adjacent the lower surface 38e of the second sheet of material 26e. In this position, the first sheet of material 10e is bondingly connected to the second sheet of material 26e by way of the bonding material 76 on the second sheet of material 26e or, more particularly, the bonding material 76 on the second sheet of material 26e bondingly engages and bondingly connects to the raised portions 74 on the first sheet of material 10e to connect the first sheet of material 10e to the second sheet of material 26e. In this connected position of the first sheet of material 10e and the second sheet of material 26e, the raised portions 74 cooperate to form a plurality of spaces 76 between the first sheet of material 10e and the second sheet of material 26e. The spaces 76 cooperate to provide an insulation when the first and the second sheets of material 10e and 26e are wrapped about a flower pot in a manner and for reasons like that described herein.

Embodiments of FIGS. 9–10

Referring now to FIG. 9, a plurality of individual sheets of material 10f are connected linearly together to form a roll 80. Preferably, the plurality of sheets of material 10f in the roll 80 are connected by perforations 82, as illustrated in FIG. 9. Such a roll 80 permits one sheet of material 10f to be withdrawn from the roll 80, then severed or disconnected from the roll 80. Alternatively, as shown in FIG. 10, the roll 80 may simply be formed as a continuous roll 80 of wrapping material without perforations, wherein a plurality of sheets of material 10f may be removed from the roll 80 by unrolling a portion of the roll 80, and using a separate cutting element (not shown) to sever the unrolled portion of the roll 80 of material to form the sheet of material 10f. The roll 80 may also be contained within a dispenser 84, as illustrated in FIG. 10. When the roll 80 is disposed in the dispenser 84, a portion of the wrapping material is again unrolled, and a serrated cutting edge 86 contained within the dispenser 84, or a separate cutting element (not shown), severs the unrolled portion of the wrapping material from the roll 80 to form a sheet of material 10f. Any number of sheets of material 10f may form the roll 80 as long as it is possible to withdraw at least one sheet 10f from the roll 80 as described herein.

Embodiments of FIGS. 11–12

The first and the second sheets of material described herein can be provided in the form of a roll of first and second sheets of material wherein the first and the second sheets of material are unrolled from the roll of first and second sheets of material and the first and the second sheets of material are severed from the roll either by perforations at spaced apart locations in the roll or by cutting the first and the second sheets of material from the roll. It also should be noted that additional sheets of material may be combined with the first and the second sheets of material if so desired in a particular application.

Shown in FIG. 11 is a roll of material 90 comprising a first material 92 and a second material 94 with the second material 94 being disposed adjacent the first material 92. The first material 94 is constructed of any of the materials described before with respect to the first sheet of material. The second material 94 is constructed of any of the materials described before with respect to the second sheet of material.

The roll of material 90 is disposed in a dispenser 96 having an opening 98 through which the materials 92 and 94 may be withdrawn from the roll of material 90. A cutting edge 100 is disposed on the dispenser 96 near the opening 98. The cutting edge 100 may be a sawtooth type of edge, as shown in FIG. 11, or the cutting edge 100 may be any other type of edge or device suitable for cutting a portion of the materials 92 and 94 from the roll of material 90 and the cutting edge 100 may be connected to the dispenser 96 or may be a separate component if desired in particular application.

The roll of material 90 has a leading edge 102. In operation, the leading edge 102 is gripped or a portion of the first and/or the second materials are gripped and the first and the second materials are unrolled and withdrawn from the roll of material 90 in a direction 104. The first and the second materials 92 and 94 are withdrawn or unrolled from the roll of material 90 until a desired length of the first and the second materials 92 and 94 have been withdrawn from the roll of material 90. In this position, a portion of the first and the second materials 92 and 94 are disposed adjacent the cutting edge 100. The first and the second materials 92 and 94 then are maneuvered to pass the first and the second materials 92 and 94 over the cutting edge 100 thereby severing a portion of the first and second materials 92 and 94 extending a distance from the leading edge 102 thereof from the roll of material 90. The portion of the first and the second materials 92 and 94 withdrawn from the roll of material 90 and severed from the roll of material 90 comprise the first and the second sheets of material as described herein.

The first and the second materials 92 and 94 in the roll of material 90 may be connected or unconnected. Further, the roll of material 90 may comprise two rolls of material with one of the rolls of material comprising the first material 92 and the other roll of material comprising the second material 94. In this last-mentioned embodiment, the first material 92 is withdrawn from the first roll of material and the second material 94 is withdrawn from the second roll of material about simultaneously so that the first and the second materials 92 and 94 are provided in a manner as generally shown in FIG. 11 for severing from the first and second rolls of material to provide the first and the second sheets of material as described herein. The term "roll of material" as used herein is intended to encompass two or more rolls in the manner generally described.

Shown in FIG. 12 is a modified roll of material 90a comprising a first material 92a and a second material 94a with a leading edge 102a. The roll of material 90a is constructed exactly like the roll of material 90 described before, except the roll of material 90a is not disposed in a dispenser constructed like the dispenser 96 shown in FIG. 11. Rather, the roll of material 90a is supported on a generally mounted shaft 106. The first and the second sheets of material 92a and 94a are withdrawn from the roll of material 90a in a manner like that described before in connection with FIG. 11 until a predetermined length of the first and the second materials 92a and 94a have been withdrawn from the roll of material 90a. In this position, a portion of the first and the second materials 92a and 94a are disposed under a knife edge 108. The knife edge 108 is connected to an actuator 110 adapted to move the knife edge 108 in a direction 112 and in a direction 114. When the predetermined length of the first and the second materials 92a and 94a have been withdrawn from the roll of material 90a, the actuator 110 actuates to move the knife edge 108 in the direction 112 to a position wherein the knife edge 108 severingly engages the materials 92a and 94a to severingly cut a portion of the first and the second materials 92a and 94a from the roll of materials 90a to provide the first and the second sheets of material as described herein. The actuator 110 may comprise a hydraulic or pneumatic cylinder or a motor and gear arrangement or any other form of arrangement suitable for moving the knife edge 108 in the directions 112 and 114. After the knife edge 108 has cuttingly severed the desired portion of the first and the second sheets of material 92a and 94a from the roll of material 90a, the actuator 110 is actuated to move the knife edge 108 in the direction 114 to a storage position disposed a distance above the first and the second materials 92a and 94a as opposed to the cutting position previously described.

Embodiment of FIG. 13

Shown in FIG. 13 is a pad 116 of first sheets of materials designated by the reference numerals 10f, 10g, and 10h in FIG. 13 and a plurality of second sheets of material designated in FIG. 13 by the reference numerals 26f, 26g and 26h. The first sheets of material 10f, 10g and 10h may be constructed like the sheet of material 10 shown in FIG. 1 and described in detail before and the second sheets of material 26f, 26g and 26h may be constructed like the second sheet of material 26 shown in FIG. 2 and described in detail before, or like any of the other first and the second sheets of material described herein. The first and the second sheets of material 10f, 10g, 10h, 26f, 26g and 26h are connected in the form of a pad 116 with the closure bonding material 24f, 24g and 24h cooperating to connect the first sheets of material 10f, 10g and 10h in the form of the pad 116. The second sheets of material 26f, 26g and 26h may be connected to the respective first sheets of material 10f, 10g and 10h or may be interleaved between the adjacent first sheets of material 10f, 10g and 10h in the pad 116. In the alternative, the second sheets of material 26f, 26g and 26h may be connected to form the pad 116 with the first sheets of material 10f, 10g and 10h being interleaved in the respective second sheets of material 26f, 26g and 26h and/or connected thereto. In operation, one of the first sheets of material 10f, 10g or 10h along with the adjacent second sheet of material 26f, 26g and 26h may be removed from the pad 116 and then placed in position to be wrapped about the flower pot.

Embodiments of FIGS. 14–16

As noted above, a first sheet of material 10 or a first sheet of material 10 and a second sheet of material 26 may be used to provide a decorative cover for an object such as a flower pot or a potted plant. To cover the object, the sheet or sheets may be manually or automatically placed in a position to be formed about the outer peripheral surface of the pot or potted plant as described in more detail below. Or, the sheet or sheets may be formed into a preformed cover which is then placed in a position to receive the pot or potted plant using the present invention.

Referring now to FIG. 14, as shown therein and designated by the general reference numeral 10j is another sheet of material constructed in accordance with the present invention. The sheet of material 10j shown in FIG. 14 has an upper surface 12j, a lower surface 14j (not shown), a first end 16j, a second end 18j, a first side 20j and a second side 22j. The ends 16j and 18j cooperate with the sides 20j and 22j to define an outer peripheral surface 24j of the sheet of material 10j. The outer peripheral surface 24j of the sheet of material 10j is defined by perforations 26j, as shown in FIG. 14.

As shown in FIG. 14, a sheet extension 28j is connected to the outer peripheral surface 24j of the sheet of material 10j. The sheet extension 28j extends a distance outwardly from the outer peripheral surface 24j of the sheet of material 10j. The sheet extension 28j has a first end 30j, a second end 32j, a first side 34j and a second side 36j. A portion of the sheet extension 28j extends a distance outwardly from the first end 16j of the sheet of material 10j terminating with the first end 30j of the sheet extension 28j. Another portion of the sheet extension 28j extends a distance outwardly from the second end 18j of the sheet of material 10j terminating with the second end 32j of the sheet extension 28j. Yet another portion of the sheet extension 28j extends a distance outwardly from the first side 20j of the sheet of material 10j terminating with the first side 34j of the sheet extension 28j. Still another portion of the sheet extension 28j extends a distance outwardly from the second side 22j of the sheet of material 10j terminating with the second side 36j of the sheet extension 28j.

The sheet extension 28j cooperates with the sheet of material 10j to define a generally square or rectangularly shaped sheet with the perforations 26j being disposed in a central portion of the sheet and defining the outer peripheral surface 24j of the sheet of material 10j. Preferably, the sheet of material 10j and the sheet extension 28j are unitary and formed from a single sheet or plies or multiple sheets one on top of the other which may or may not be laminated.

The sheet of material 10j and the sheet extension 28j are constructed from any suitable flexible material that is capable of being wrapped about a flower pot and formed into the covering, as described herein. Preferably, the sheet of material 10*j* and the sheet extension 28*j* are constructed of a material selected from a group of materials consisting of paper, metal foil, cloth (natural or synthetic), denim, burlap or polymer film as defined above or combinations thereof.

The sheet of material 10*j* and the sheet extension 28*j* have a thickness in a range from about 0.1 mils to about 30 mils. Preferably, the sheet of material 10*j* and the sheet extension 28*j* have a thickness in a range from about 0.1 mils to about 5 mils.

The sheet of material 10*j* and the sheet extension 28*j* may be any shape and a rectangular shape is shown in FIG. 19 only by way of example. The sheet of material 10*j* and the sheet extension 28*j* for example only, may be square, rectangular, circular or any other geometric shape such as heart shaped.

The sheet of material 10*j* and the sheet extension 28*j* may be constructed of a single layer of material or a plurality of layers of the same or different types of materials. Any thickness of the sheet of material 10*j* and the sheet extension 28*j* may be utilized in accordance with the present invention as long as the sheet of material 10*j* and the sheet extension 28*j* is wrappable about a flower pot and formable into the covering, as described herein. The layers of material comprising the sheet of material 10*j* and the sheet extension 28*j* may be connected together or laminated or may be separate layers.

The sheet extension 28*j* is transparent, although a decorative pattern also may be applied to the sheet extension 28*j*.

The sheet extension 28*j* preferably includes a bonding material 72*j* (FIG. 14) disposed on the upper surface of the sheet extension 28*j* and extending about the outer peripheral surface of the sheet extension 28*j*. After the sheet extension 28*j* has been formed about the floral grouping, the ends of the sheet of material may be bonded together to provide a closed end. The term "bonding material" as used herein is as defined below.

The sheet extension 28*j* remains in a position extending about the floral grouping until it is desired to remove the sheet extension 28*j*. The sheet extension 28*j* is removed from the pot cover 56*j* (not shown) formed from the sheet of material 10*j* by tearing along the perforations 26*j* so as to separate the sheet extension 28*j*. The sheet extension 28*j* then is removed leaving the pot cover formed from the sheet of material 10*j* providing a decorative cover for a pot In addition to the perforations 26*j*, the sheet extension 28*j* also may include perforations extending between the perforations 26*j* and the outer peripheral surface of the sheet extension 28*j* to further assist in the removal of the sheet extension 28*j* when it is no longer desired to keep the sheet extension 28*j* extending about the floral grouping.

Shown in FIG. 15 and designated by the general reference number 10*k* is a sheet of material constructed in accordance with the present invention. The sheet of material 10*k* includes a first end 12*k*, a second end 14*k*, a first side 16*k* and a second side 18*k*. The sheet of material 10*k* also includes an upper surface 20*k* (FIG. 15) and a lower surface 22*k* (not shown).

A connecting bonding material 24*k* is disposed on the upper surface 20*k* of the sheet of material 10*k*. The sheet of material 10*k* has an outer peripheral surface 26*k*. The connecting bonding material 10*k* is disposed near and spaced a distance 28*k* from the outer peripheral surface 26*k* of the sheet of material 10*k* and extends generally circumferentially about the sheet of material 10*k*.

The sheet of material 10*k* shown in FIG. 15 is circularly shaped. and the connecting bonding material 24*k* extends in a circularly shaped pattern over the upper surface 20*k* of the sheet of material 10*k*. The sheet of material 10*k* may be any geometric shape such as square or rectangular or heart shaped or trapezoidally shaped or any other geometric shape. Further, the connecting bonding material 24*k* may extend in any geometric pattern over the upper surface 20*k* of the sheet of material 10*k*, and the circularly shaped pattern is shown in FIG. 15 only by way of example.

A sheet extension 25*k* is connected to the sheet of material 10*k*. The sheet extension 25*k* extends about the outer peripheral surface 26*k* of the sheet of material 10*k*. The sheet extension 25*k* extends outwardly from the sheet of material 10*k* terminating with an outer peripheral surface 27*k*. The sheet extension 25*k* has an upper surface 29*k* (FIG. 15) and a lower surface 31*k* (not shown). The upper surface 29*k* is disposed in a plane about coplanar with the upper surface 20*k* of the sheet of material 10*k* and lower surface 31*k* is disposed in a plane about coplanar with the lower surface 22*k* of the sheet of material 10*k*.

The sheet extension 25*k* and the sheet of material 10*k* may be integrally constructed of a single sheet of material or the sheet extension 25*k* may be laminated to the sheet of material 10*k*. A connecting bonding material 33*k* is disposed on the upper surface 29*k* of the sheet extension 25*k*. The connecting bonding material 33*k* is disposed near and spaced a distance from the outer peripheral surface 27*k* of the sheet extension 25*k* and extends generally circumferentially about the sheet extension 25*k*.

The sheet extension 25*k* is shown in FIG. 15 as being circularly shaped. The sheet extension 25*k* may be any geometric shape such as a square or rectangular or heart shaped or trapezoidally shaped or any other geometric shape and the geometric shape of the sheet extension 25*k* may be the same as the geometric shape of the sheet of material 10*k* or the sheet extension 25*k* may have a geometric shape different from the geometric shape of the sheet of material 10*k*. Further, although the sheet extension 25*k* is shown in FIG. 15 as extending circumferentially about the outer peripheral surface 26*k* of the sheet of material 10*k*, the sheet extension 25*k* may extend only about a portion of the outer peripheral surface 26*k* of the sheet of material 10*k* or the sheet extension 25*k* may comprise segments with each segment extending about a portion of the outer peripheral surface 26*k* of the sheet of material 10*k*.

The sheet of material 10*k* and the sheet extension 25*k* may be constructed of a single layer of material or a plurality of layers of the same or different types of materials as described above. Any thickness of the sheet of material 10*k* and the sheet extension 25*k* may be utilized in accordance with the present invention as long as the sheet of material 10*k* and the sheet extension 25*k* are wrappable or formable about a flower pot or a floral grouping in the manners described herein. The layers of material comprising the sheet of material 10*k* and the sheet extension 25*k* may be connected together or laminated or may be separate layers. A decorative pattern, such as a color and/or an embossed pattern, and/or other decorative surface ornamentation may be applied to the upper surface 20*k* and/or the lower surface 22*k* of the sheet of material 10*k* or portions thereof as described above.

A decorative pattern, such as a color and/or an embossed pattern, and/or other decorative surface ornamentation may be applied to the upper surface 29*k* and/or the lower surface 31*k* of the sheet extension 25*k* or portions thereof as described above. The sheet extension 25*k* also may be totally or partially clear or tinted transparent material as described above.

The connecting bonding materials 24k and 33k are shown in FIG. 15 as being applied to the upper surface 20k or the upper surface 29k in the form of a circularly shaped strip. The connecting bonding materials 24k or 33k may be applied in the form of spots or spaced apart strips and the spots may be any geometric pattern or any other type of pattern such as a logo, for example. Further, the connecting bonding materials 24k or 33k may include a color to obscure the fact that the connecting bonding materials 24k and 33k are disposed on the sheet of material 10k or the sheet extension 25k.

In a preferred form, a line of perforations 53k (FIG. 15) is formed between the sheet of material 10k and the sheet extension 25k. The line of perforations 53k extends generally about the outer peripheral surface 26k of the sheet of material 10k. The sheet extension 25k encompasses a floral grouping (not shown) and provides a protective covering for the floral grouping to protect the floral grouping during shipment and/or storage. When it is desired to remove the protective covering provided by the sheet extension 25k, the operator tears the sheet extension 25k along the line of perforations 53k thereby severing or separating the sheet extension 25k from the sheet of material 10k so that the sheet extension 25k can be removed from the sheet of material 10k or, in other words, the protective covering may be removed from the decorative covering by tearing along the line of perforations 53k.

Alternatively, the sheet of material may be preformed into a cover 120 having an opening 122 as shown in FIG. 16. The cover 120 is self-supporting by virtue of overlapping folds which are bonded to each other, thereby forming a rigid structure. The preformed cover 120 may be deposited into an opening in a table or platform to support the cover 120. A potted plant can then be disposed into the opening 122 of the preformed cover 120, thereby resulting in a covered potted plant (not shown).

One method for forming such a preformed plant cover or pot cover is shown in U.S. Pat. No. 4,773,182 entitled "Article Forming System" issued to Weder et al., on Sep. 27, 1988, which is hereby incorporated herein by reference.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands or rubber bands and also includes any other type of material such as a string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as a flower pot. The band also may include a bow if desired in a particular application.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

Embodiments of FIGS. 17–19B

Referring now to FIGS. 17 and 18, an apparatus constructed in accordance with the present invention is generally referred to by the reference numeral 126. The cover forming and fastening apparatus 126 comprises a platform 130 having an upper support surface 132 which has a first end 134, a second end 136, a first side 138, and a second side 140. The platform 130 has a platform opening 142, as shown in FIG. 18, for accommodating a conveyable cover forming assembly or mold 146. The platform 130 has a plurality of vacuum ports 144 for releasably securing a sheet of material during operation. The conveyable cover forming assembly or mold 146 having an outer peripheral surface 148, a lower end 150 and an opening 152, is disposed generally within the platform opening 142 for receiving a potted plant during operation.

The cover forming and fastening machine 126 further comprises a conveying assembly such as a rail 154 having a first end 156 and a second end 158 and a groove 160 disposed longitudinally therein from near first end 156 to near second end 158. On the lower end 150 of the conveyable cover forming assembly or mold 146 is located an adaptor 162. The adaptor 162 fits within the groove 160 of the rail 154.

The cover forming and fastening apparatus 126 further comprises a drive assembly 164 which functions to cause the conveyable cover forming mold 146 to be driven from one end of the rail 154 to the other in the direction 166 from the first end 156 to the second end 158 during operation of the apparatus 126. Located generally in the vicinity of end 158 of the rail 154 is a fastener applicating assembly such as a tying machine 170 of a type commercially available and well known to those of ordinary skill in the art. Examples of fastening machines include tying machines such as those commercially available from Saxmeyer, Bunn, Felins, and Cyclops.

The tying machine 170 has a tying arm 172, a knotter head 174, and a spool 176. The spool 176 supplies a fastening element 178 such as a string to the tying arm 172, the opposite end of the fastening element 178 being attached to the knotter head 174. The tying machine 170 has a tying area 180 to which the conveyable cover forming mold 146 is conveyed along the rail 154 by the drive assembly 164 during operation.

One version of the conveyable cover forming mold 146 is shown in greater detail in FIG. 19A. The conveyable cover forming mold 146 has an outer peripheral surface 148, a lower end 150, an opening 152 and an adaptor 162 as described above. An alternate version of a conveyable cover forming assembly or mold is shown in FIG. 19B and is generally designated by the reference numeral 146a. Mold 146a is comprised generally of a plurality of fingers 147 attached to a lower end 150a of the mold 146a and thereby forming an opening 152a sized to receive a pot. Attached to the lower end 150a is an adaptor 162a which engages the rail 154.

Embodiment of FIGS. 20–21

Referring now to FIGS. 20 and 21, an alternate version of the cover forming and fastening machine is represented generally by the reference numeral 126a. The cover former and fastening machine 126a is exactly the same as the cover forming and fastening machine 126 described above except that in addition it has a platform extension 188 for supplying a roll of material 190 which in turn supplies sheets of material to be used during operation of the apparatus 126a. The roll of material 190, which is similar to rolls 80 or 90 described in FIGS. 9–12 above, is mounted upon a support shaft 192. A portion 194 of the roll of materials 190 is fed through rollers 196 and 198. Roller 196 moves in direction 200 while roller 198 moves in direction 202 thereby causing the portion 194 of the roll of material 190 to be advanced through the rolls 196 and 198 in direction 204 over the platform extension 188.

As described earlier in greater detail in FIG. 12, the portion of material 194 is advanced a predetermined distance on the upper surface 132 of the platform 130. Once the portion of roll 190 has been advanced a predetermined distance on the platform a knife 208 is actuated by an actuator 210 to sever a portion 194 of the roll 190 from the roll of material 190 thereby providing a sheet of material sized for use by the cover forming and fastening apparatus 126a.

Embodiments of FIGS. 22A–22D

Referring now to FIGS. 22A–22D, the cover forming and fastening apparatus is described in operation. By example, the cover forming and fastening machine 126 will be described in operation in FIGS. 22A–22D, but it will be understood by one of ordinary skill in the art that the cover forming and fastening machine 126a works in substantially the same manner as well as other modified version of the cover forming and fastening machine 126 described herein.

Figure 22B:
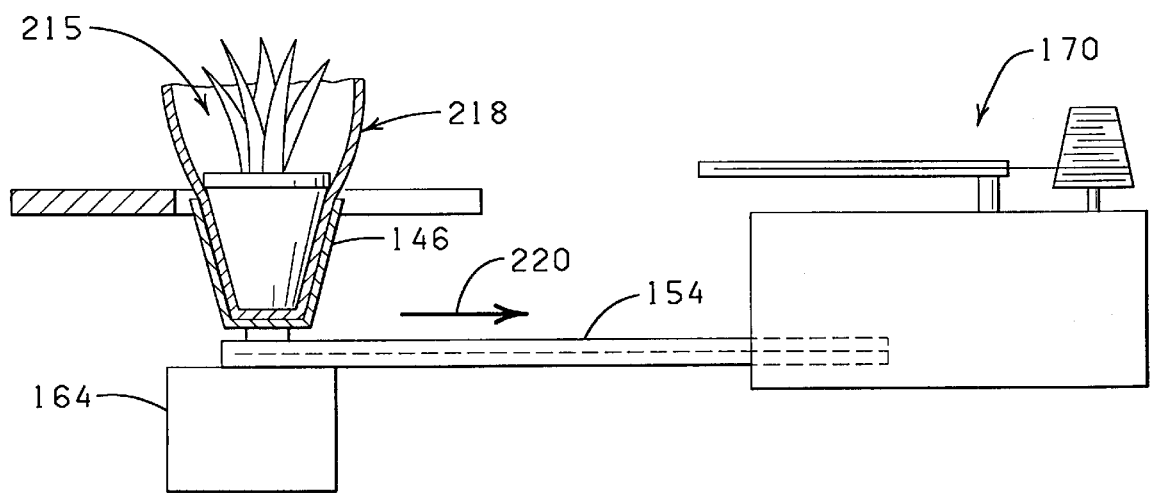
Figure 22C:
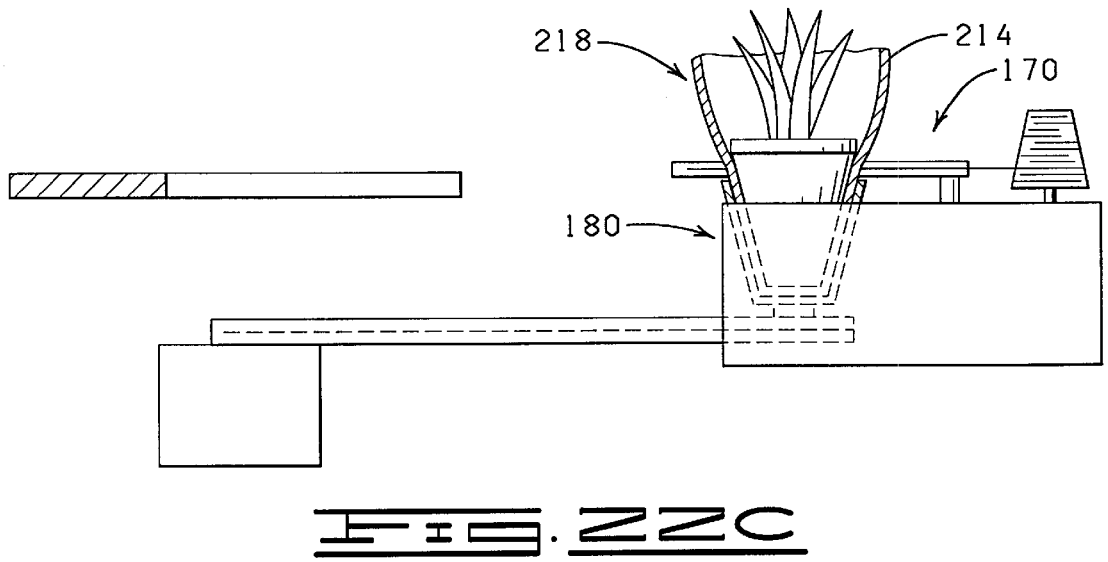
Figure 22D:
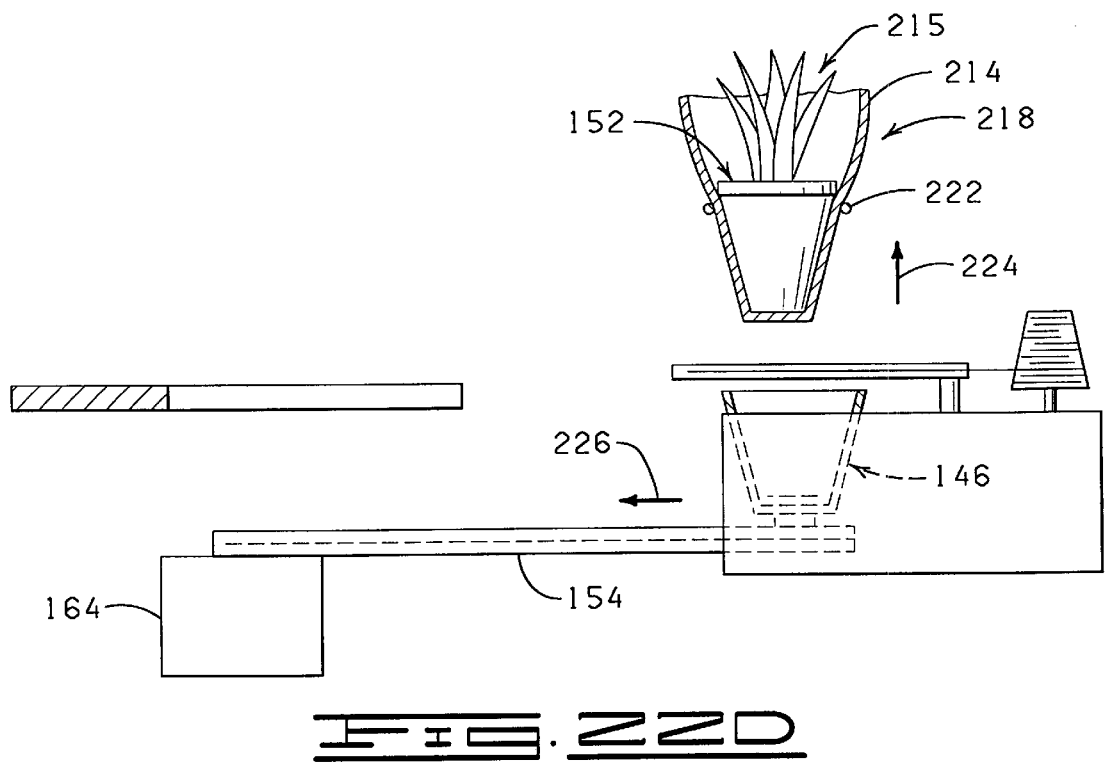

In operation, a sheet of material 214 which may be exactly the same as or similar to any of the sheets of material described in FIGS. 1–15 may be placed on the upper support surface 132 of the platform 130 as shown in FIG. 22A. A potted plant 215 comprising a plant and the pot in which the plant is disposed is disposed generally over the sheet of material 214 and above the opening 152 of the conveyable cover forming assembly or mold 146. The pot of the potted plant has an upper end 216. The sheet 214 may be supplied to the upper support surface 132 either manually or automatically. The potted plant 215 is passed in a direction 217 into the interior of the conveyable cover forming mold 146 thereby forming a covered potted plant 218 as shown in FIG. 22B. The conveyable cover forming mold 146 containing the covered potted plant 218 is conveyed in a direction 220 by the drive assembly 164 along the rail 154 to the Fastening machine 170 as shown in FIG. 22B. The covered potted plant 218 in the mold 146 is arrested at a fastening position 180 of the fastening machine 170 as shown in FIG. 22C. Once in the fastening position 180 a tie or fastener 222 is disposed about the exterior peripheral surface of the covered potted plant 218 as shown in FIG. 22D.

The tie or fastener 222 may be applied with or without a bow or in any manner feasible by the fastening machine.

The covered potted plant 218 having the tie or fastener 222 disposed thereabout is then removed from the conveyable cover forming assembly or mold 146 by lifting the covered potted plant in direction 224. Once the covered potted plant 218 has been removed from the conveyable cover forming mold 146, the conveyable cover forming mold 146 is returned in direction 226 via the rail 154 to the vicinity of the cover forming platform 132 by the drive assembly 164 as shown in FIG. 22D. Alternatively, the conveyable cover forming mold 146 may be returned via the rail 154 to the vicinity of the platform 132 before the covered potted plant 218 has been removed.

In another version of the invention, the cover forming and fastening machine 126 may further comprise a labeling apparatus (not shown) for automatically applying a label to a portion of the outer surface of the cover of the covered potted plant 218. Such labeling machines are commercially available and are known to those of ordinary skill in the art. The sheet of material as described in more detail above, which is used in accordance with the present invention, is constructed from material selected from a group of materials consisting of paper, metal foil, cloth (natural or synthetic), denim, burlap or polymer film or combinations thereof.

The apparatus may further comprise a pick and place assembly (not shown) for picking up the article from an article supply and for placing the article into the opening to form the covered article. Additionally, the apparatus may further comprise a removal assembly for automatically removing the covered article from the platform. The cover forming and fastening machine 126 may be located on an axis off a 90° angle and may be portable or stationary. Such pick and place machines and removal assemblies are known to those of ordinary skill in the art and are commercially available.

As noted earlier, the cover forming and fastening machine 126 can use precut sheets which are fed manually or automatically with a dispenser which feeds a sized sheet from a roll to the proper working position on the platform. Automatic sheet feeding devices are well known in the art. Examples of such sheet feeding machines are shown in U.S. Pat. Nos. 4,887,805 issued to Herbert et al., 4,889,331 issued to Sardella, and 5,090,676 issued to Matsumo et al. An automatic sheet feeding machine may be detachably connected to the framework of the apparatus of the present invention.

Figure 23:
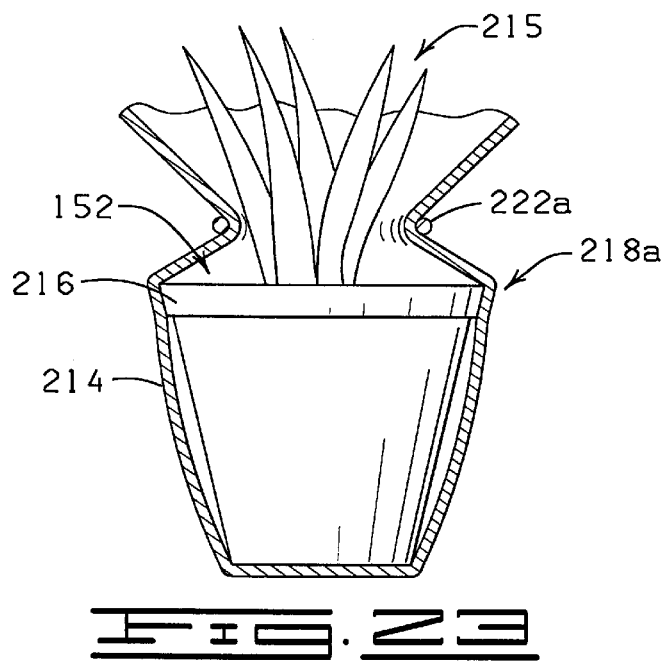
FIG. 23 is a side view of a potted plant having a cover fastened thereto.
Figure 24:
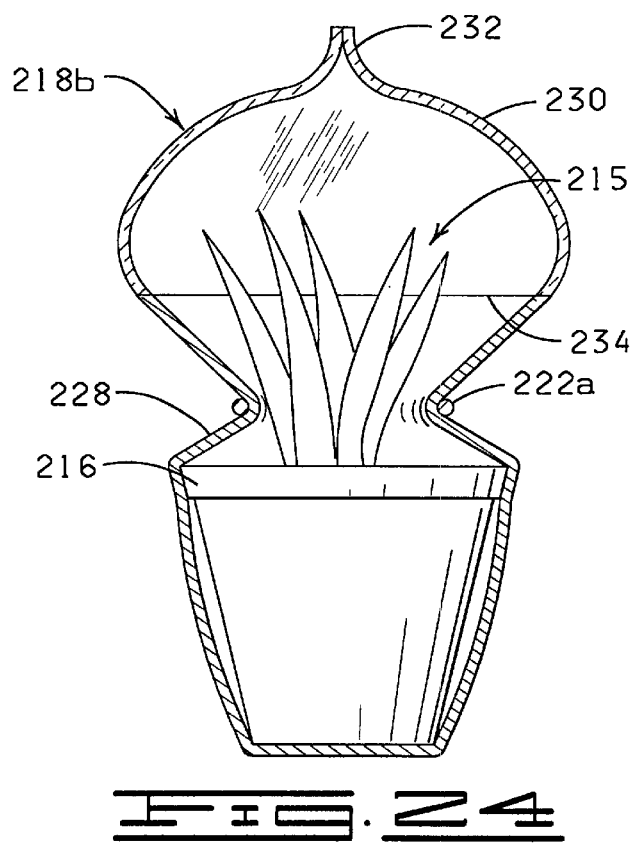
FIG. 24 is a side view of a potted plant having a cover fastened thereto, the cover having a sheet extension.

Embodiments of FIGS. 23–24

Shown in FIGS. 22A–22D is a covered potted plant 218 in which the tie or fastener 222 is applied at a position below the upper end 216 of the flower pot containing the potted plant 215. Alternatively, as indicated in FIGS. 23 and 24, a tie or fastener may be applied at a position above the upper end 216 of the flower pot containing the potted plant 215. Designated by the general reference numeral 218a is a covered potted plant in which a tie or fastener 222a is applied at a position above the upper end 216 of the flower pot containing the potted plant 215.

Shown in FIG. 24, alternatively, is a covered potted plant 218b in which the potted plant 215 is covered by a sheet of material 228 having a sleeve 230 which forms a sheet extension and which can be closed at a position 232 above the potted plant 215. The sleeve 230 may be detachable from the sheet 228 via a perforation zone 234.

Changes may be made in the construction and the operation of the various components, elements and assemblies described herein or in the steps or in the sequence of steps of the methods described herein without departing from the spirit and scope of the invention as defined in the following claims.

What is claimed is:

1. A method for processing an article, comprising:
 providing the article having an outer peripheral surface;
 providing a sheet of material;
 forming the sheet of material about at least a portion of the outer peripheral surface of the article;
 providing a fastener applicating means having a fastening station for applying a fastener about the cover;
 moving the article having the cover formed about the outer peripheral surface of the article to the fastening station of the fastener applicating means;
 automatically applying the fastener about a portion of the cover formed about at least a portion of the outer peripheral surface of the article at the fastening position of the fastener applicating means; and
 removing the article having the cover fastened thereabout from the fastener applicating means.

2. The method of claim 1 wherein, in the step of providing the sheet of material, the material further comprises a material selected from a group of materials consisting of paper, metal foil, cloth (natural or synthetic), denim, burlap or polymer film or combinations thereof.

3. The method of claim 1 wherein the step of forming the sheet of material about at least a portion of the outer peripheral surface of the article is performed automatically.

4. The method of claim 1 wherein in the step of providing the article, the article is further defined as a flower pot.

5. The method of claim 1 wherein, in the step of forming the sheet of material about at least a portion of the outer peripheral surface of the article, the article is automatically moved to a cover forming position where the sheet of material is formed into the cover extending about at least a portion of the outer peripheral surface of the article.

6. The method of claim 1 wherein, in the step of automatically applying a fastener about a portion of the cover formed about at least a portion of the outer peripheral surface of the article, the fastener is selected from a group consisting of elastic or non-elastic string, wire, thread, elastic bands, ribbon, wire and tape.

7. The method of claim 1 further comprising:
 providing a labeling means for automatically applying a label; and
 automatically applying a label to the cover formed about at least a portion of the outer peripheral surface of the article.

8. The method of claim 1 wherein the fastener applicating means is a tying device.

9. The method of claim 4 wherein the flower pot is further characterized as having an upper end and wherein the fastener is applied about a portion of the cover which extends above the upper end of the flower pot.

10. The method of claim 4 wherein the flower pot is further characterized as having an upper end and wherein the fastener is applied about a portion of the cover which is disposed below the upper end of the flower pot.

11. A method for processing an article, comprising:
 providing cover forming means for forming a sheet of material into a cover which extends about at least a portion of an outer peripheral surface of the article;
 forming a cover from the sheet of material which extends about at least a portion of the outer peripheral surface of the article by moving the article and the sheet of material into the cover forming means;
 providing a fastener applicating means for automatically applying a fastener about the cover;
 conveying the cover forming means and the article having the cover formed about at least a portion of the outer peripheral surface of the article from the cover forming position of the cover forming means to a fastening position of the fastener applicating means;
 automatically applying a fastener about a portion of the cover for fastening the cover about at least a portion of the outer peripheral surface of the article; and
 engaging an automatic labeling means for automatically applying a label to a portion of the cover.

12. A method for applying and fastening a sheet of material about a flower pot, comprising:
 providing a flower pot having an upper end and an outer peripheral surface;
 providing a sheet of material;
 forming the sheet of material into a cover about at least a portion of the outer peripheral surface of the flower pot;

providing a fastener applicating means for automatically applying a fastener;

moving the flower pot having the cover formed about at least a portion of the outer peripheral surface thereof to a fastening position of the fastener applicating means;

automatically applying a fastener about a portion of the cover formed about at least a portion of the outer peripheral surface of the flower pot at the fastening position of the fastener applicating means; and removing the flower pot having the cover fastened thereabout from the fastener applicating means.

13. The method of claim 12 wherein, in the step of providing the sheet of material, the sheet of material comprises a material selected from a group of materials consisting of paper, metal foil, cloth (natural or synthetic), denim, burlap or polymer film or combinations thereof.

14. The method of claim 12 wherein the step of forming the sheet of material about at least a portion of the outer peripheral surface of the flower pot is performed automatically.

15. The method of claim 12 wherein, in the step of automatically applying a fastener about at least a portion of the outer peripheral surface of the flower pot at the fastening position of the fastener applicating means, the fastener is automatically applied to a portion of the cover disposed above the upper end of the flower pot.

16. The method of claim 12 wherein, in the step of forming the sheet of material about at least a portion of the outer peripheral surface of the flower pot, the flower pot is automatically moved to a cover forming position where the sheet of material is formed into the cover extending about at least a portion of the outer peripheral surface of the flower pot.

17. The method of claim 12 wherein, in the step of automatically applying a fastener about a portion of the cover formed about at least a portion of the outer Peripheral surface of the flower pot, the fastener is selected from a group consisting of elastic or non-elastic string, wire, thread, elastic band, ribbon, wire and tape.

18. The method of claim 12 further comprising:

providing a labeling means for automatically applying a label; and automatically applying a label to the cover formed about at least a portion of the outer peripheral surface of the article.

19. The method of claim 12 wherein the fastener applicating means is a tying device.

20. The method of claim 12 wherein, in the step of automatically applying a fastener about at least a portion of the outer peripheral surface of the flower pot at the fastening position of the fastener applicating means, the fastener is automatically applied to a portion of the cover disposed above the upper end of the flower pot.

21. A method for applying and fastening a sheet of material about a flower pot, comprising:

providing cover forming means for forming a sheet of material into a cover which extends about at least a portion of an outer peripheral surface of the flower pot;

forming a cover from the sheet of material which extends about at least a portion of the flower pot by moving the flower pot and the sheet of material into the cover forming means;

providing a fastener applicating means for automatically applying a fastener about the cover;

conveying the cover forming means and the flower pot having the cover formed about at least a portion of the outer peripheral surface of the flower pot from the cover forming position of the cover forming means to a fastening position of the fastener applicating means;

automatically applying a fastener about a portion of the cover for fastening the cover about at least a portion of the outer peripheral surface of the flower pot; and engaging an automatic labeling means for automatically applying a label to a portion of the cover.

* * * * *

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

The title page, showing the illustrative figure, should be deleted and substitute therefore the attached title page.

United States Patent [19]
Weder et al.

[11] Patent Number: 5,839,256
[45] Date of Patent: *Nov. 24, 1998

[54] CONVEYABLE COVER FORMER AND FASTENING SYSTEM

[75] Inventors: Donald E. Weder; Joseph G. Straeter, both of Highland, Ill.

[73] Assignee: Southpac Trust International, Inc.

[*] Notice: The term of this patent shall not extend beyond the expiration date of Pat. No. 5,450,707.

[21] Appl. No.: 826,841

[22] Filed: Apr. 7, 1997

Related U.S. Application Data

[63] Continuation of Ser. No. 465,294, Jun. 5, 1995, Pat. No. 5,661,952, which is a continuation of Ser. No. 88,976, Jul. 8, 1993, Pat. No. 5,450,707.

[51] Int. Cl.[6] ............... B65B 11/18; B65B 49/00; B65B 51/00
[52] U.S. Cl. ............... 53/399; 53/139.4; 53/209; 53/221; 53/414; 53/464
[58] Field of Search ............ 53/399, 397, 139.4, 53/138.6, 414, 464, 583, 582, 590, 589, 209, 211

[56] References Cited

U.S. PATENT DOCUMENTS

| | | | |
|---|---|---|---|
| 1,498,981 | 6/1924 | Ryder et al. | |
| 2,148,587 | 2/1939 | Slocum | 53/464 |
| 2,165,840 | 7/1939 | Doble | 53/464 |
| 2,274,526 | 2/1942 | Bunn | 100/31 |
| 2,514,038 | 7/1950 | Doolittle | 226/129 |
| 3,318,230 | 5/1967 | Hilton | 100/4 |
| 3,528,212 | 9/1970 | Jones | 53/464 |
| 3,974,762 | 8/1976 | Kita et al. | 100/9 |
| 4,041,672 | 8/1977 | Gularte | 53/3 |
| 4,054,160 | 10/1977 | Knudsen | 140/93 |
| 4,143,594 | 3/1979 | Falq | 100/7 |
| 4,362,096 | 12/1982 | Hanscom | 100/10 |
| 4,401,020 | 8/1983 | Brux | 100/7 |
| 4,601,156 | 7/1986 | Parry et al. | 53/399 |
| 5,105,599 | 4/1992 | Weder | 53/464 |
| 5,249,407 | 10/1993 | Stuck | 53/399 |

FOREIGN PATENT DOCUMENTS 0554520 8/1993 European Pat. Off.

OTHER PUBLICATIONS

Rubber Band Technology, Ltd. Yakima, WA *Bandmaster 102 Model ET* (No Date).
Rubber Band Technology, Ltd. Yakima, WA *Bandmaster 102 Model AF* (No Date).
Strapack Inc. Tokyo, Japan, Sivaron S–661M & 661Y. ©1984.
Strapack Inc. Tokyo, Japan, Strapack Semiautomatic Strapping Machine S–660 ©1988 Strapack Corp.
Universal Strapping Corp *Uni-Pac Portable Strapping Kit* no date.
Cyklop Strapping Corp. Downingtown, PA Cyklop EM–15 (2 pgs) ©1987 Cyclop Strapping Corp.
Strapex Corp. Charlotte, NC How To Strap Without Getting In A Bind (2 pages, no date).
Cyklop Strapping Corp., Downgton, PA ASM Series (2 pgs) ©1988 Cyklop Strapping Corp.
Strapack Corp, Tokyo, Japan, StraPack Semi–Automatic Strapping Machine, Sivaron S–662 (2 pgs. no date).

(List continued on next page.)

*Primary Examiner*—James F. Coan
*Attorney, Agent, or Firm*—Dunlap & Codding, P.C.

[57] ABSTRACT

A method for forming a cover about an article from a sheet of material and for automatically fastening the cover to the article, and optionally, for automatically placing a label on the covered article. The sheet od material is formed into a cover about the article and a fastener is automatically positioned about a portion of the cover for fastening the cover about the article wherein the article having the cover formed about at least a portion of the outer peripheral surface of the article is moved to a fastening station of the fastening device. A labeling device may also be provided for automatically applying a label to the covered article.

21 Claims, 9 Drawing Sheets

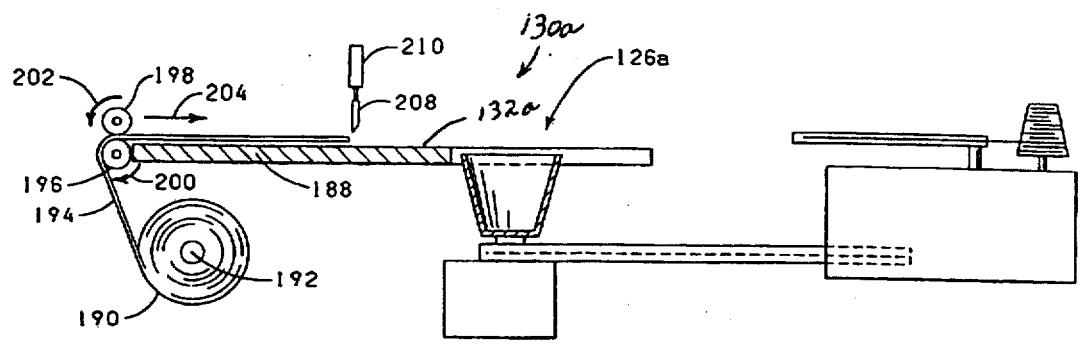

UNITED STATES PATENT AND TRADEMARK OFFICE
CERTIFICATE OF CORRECTION

PATENT NO.   : 5,839,256
DATED        : November 24, 1998
INVENTOR(S)  : Donald E. Weder et al.

It is certified that error appears in the above-identified patent and that said Letters Patent is hereby corrected as shown below:

Drawings,
Fig. 2, correct the lead line for "28" to indicate the first edge.

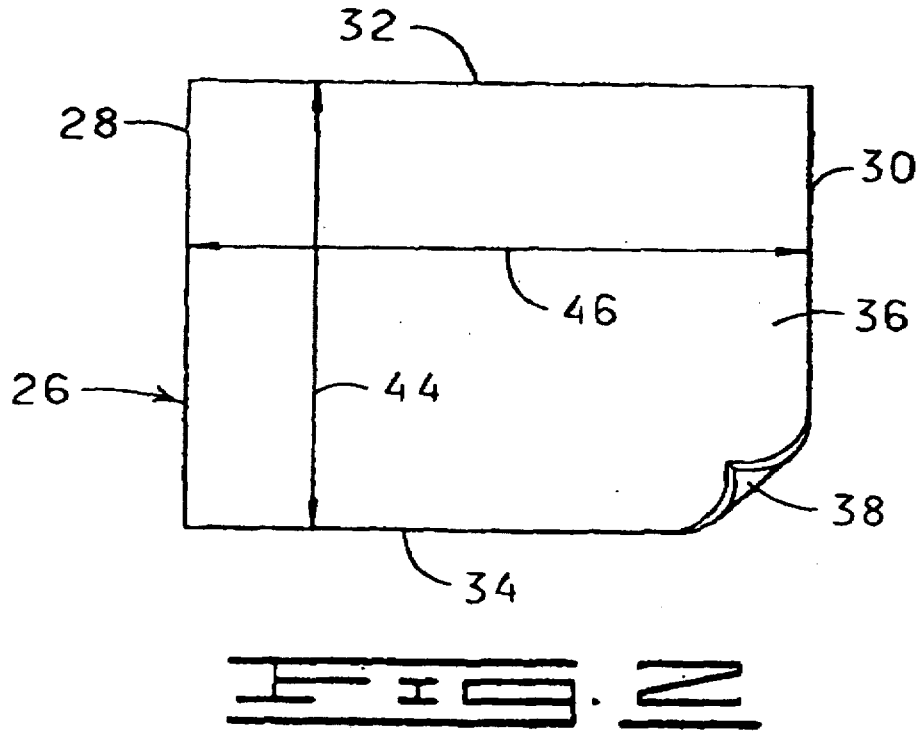

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Fig. 4, add the numerlas -- 20a -- and -- 38a -- and each associated lead line.

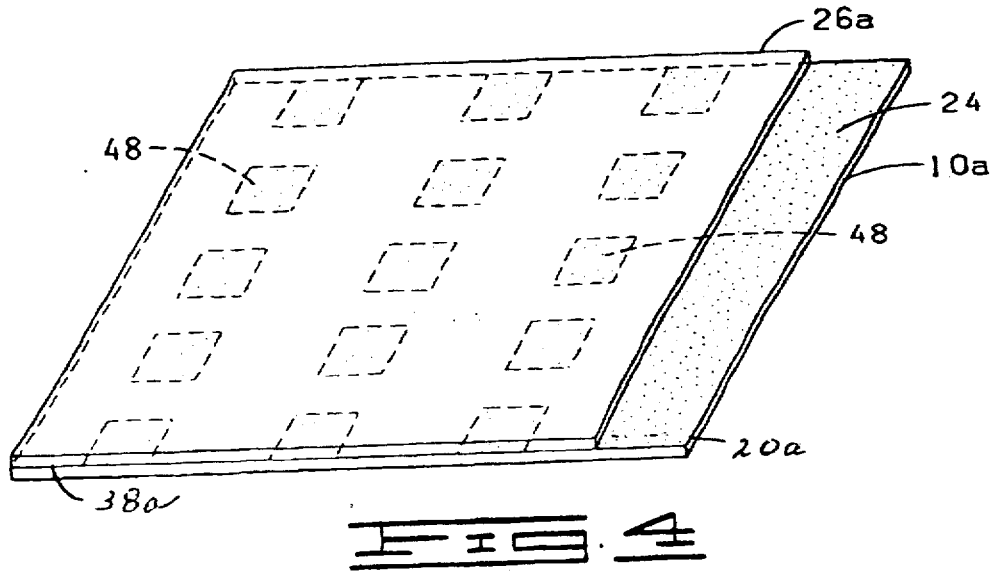

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Fig. 7, extend the lead line on numeral "20d " to indicate the upper surface of the first sheet of material.

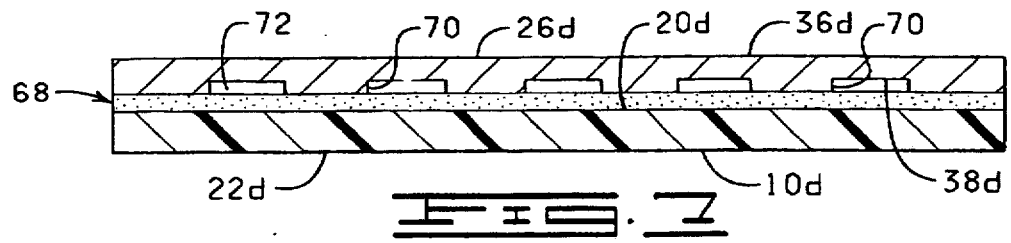

UNITED STATES PATENT AND TRADEMARK OFFICE
CERTIFICATE OF CORRECTION

PATENT NO. : 5,839,256  
DATED : November 24, 1998  
INVENTOR(S) : Donald E. Weder et al.

Page 6 of 13

It is certified that error appears in the above-identified patent and that said Letters Patent is hereby corrected as shown below:

Fig. 20, add the numerals -- 130a -- and -- 132a -- and each associated lead line.

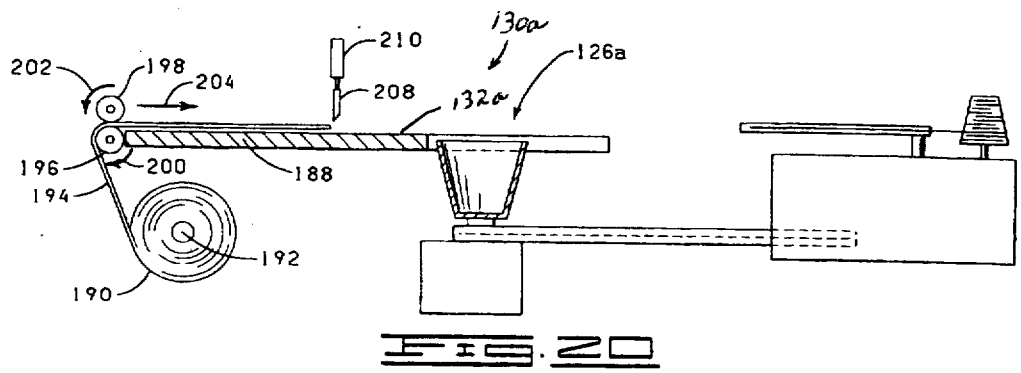

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

Page 7 of 13

It is certified that error appears in the above-identified patent and that said Letters Patent is hereby corrected as shown below:

Fig. 21, add the numerals -- 130a -- and -- 132a -- and each associated lead line.

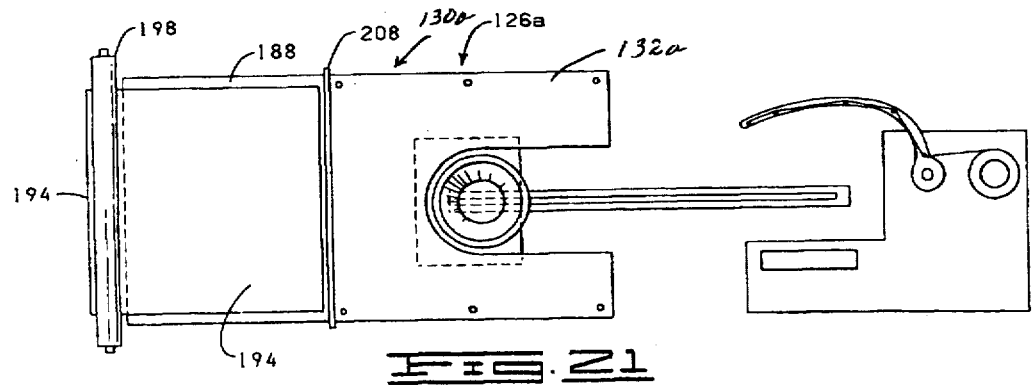

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Fig. 22C, add the numeral -- 215 -- and its associated lead line.

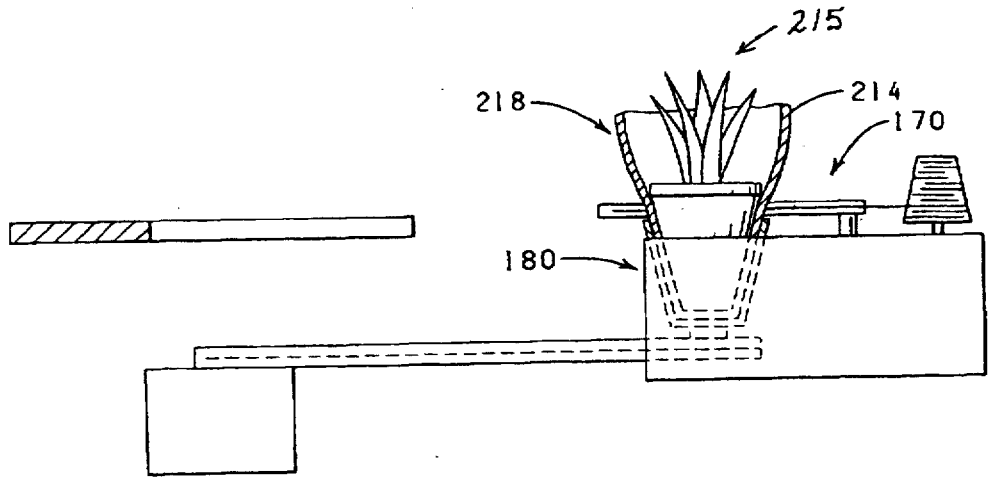

UNITED STATES PATENT AND TRADEMARK OFFICE
CERTIFICATE OF CORRECTION

PATENT NO.   : 5,839,256
DATED        : November 24, 1998
INVENTOR(S)  : Donald E. Weder et al.

It is certified that error appears in the above-identified patent and that said Letters Patent is hereby corrected as shown below:

Fig. 22A, add the numeral -- 130a -- and its associated lead line.

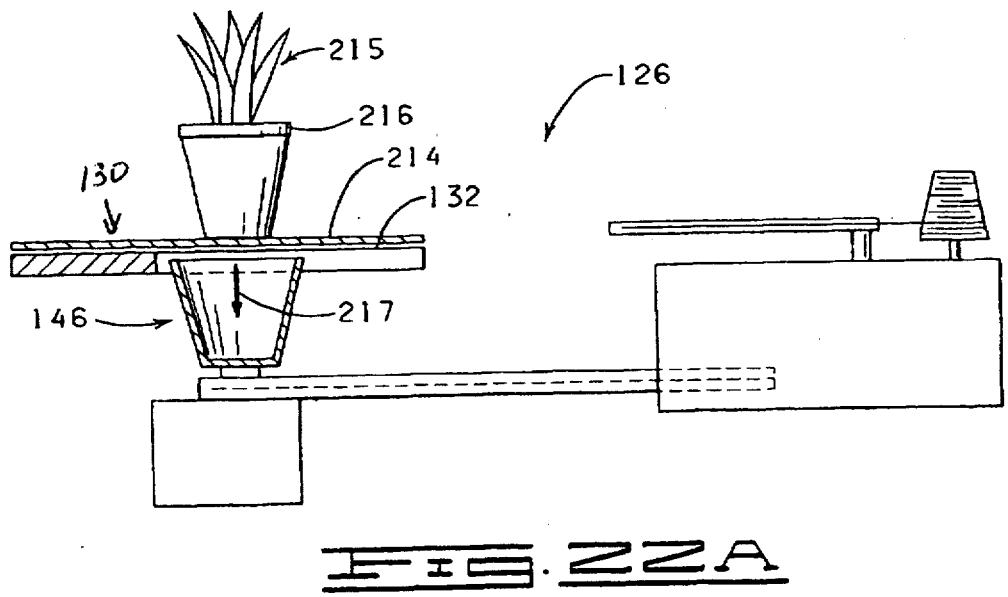

UNITED STATES PATENT AND TRADEMARK OFFICE
CERTIFICATE OF CORRECTION

PATENT NO.  : 5,839,256
DATED       : November 24, 1998
INVENTOR(S) : Donald E. Weder et al.

It is certified that error appears in the above-identified patent and that said Letters Patent is hereby corrected as shown below:

ABSTRACT,
"Item [57], line 4, delete "od" and substitute therefor -- of --.

OTHER PUBLICATIONS,
Column 1,
Line 7, delete "Ny" and substitute therefor -- NY --.
Line 21, delete "Applications," and substitute therefor -- Application, --.

Column 1,
Line 22, delete "article." and substitute -- article -- therefor;
Line 52, after "comprises" and before "conveying" insert -- a --.

Column 2,
Line 49, delete "cross sectional" and substitute -- cross-sectional -- therefor.
Line 54, delete "cross sectional" and substitute -- cross-sectional -- therefor.

Column 3,
Line 35, delete "FIG. 22A-22D" and substitute therefor -- FIGS. 22A-22D --;

Column 4,
Line 16, delete "comprises" and substitute therefor -- comprise --;

Column 6,
Line 37, after "material" and before "is" insert -- 26 --;
Line 42, delete "side." and substitute -- side -- therefor;
Line 66, after "material" and before "may" insert -- 24 --;
Line 67, after "surface" and before "of" insert -- 20 --;

Column 7,
Line 3, delete "material," and substitute -- material 24 -- therefor;

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Column 8,
Line 13, after "material" and before "may" insert -- 24 --
Line 14, after "surface" and before "of" insert -- **20*a*** --
Line 15, after "surface" and before "of" insert -- **38*a*** --
Line 15, delete "material of" and substitute -- of material -- therefore;
Line 17, after "surface" (first occurrence) and before "of" insert -- **20*a*** --
Line 14, after "surface" (second occurrence) and before "of" insert -- **38*a*** --

Column 9,
Line 54, delete "76" and substitute -- 78 -- therefor;
Line 56, delete "76" and substitute -- 78 -- therefor;

Column 10,
Line 36, delete "material." and substitute therefor -- material 10. --;
Line 38, delete "material." and substitute therefor -- material 26. --;
Line 52, after "materials" and before "are" insert -- 92, 94 --;
Line 53, after "materials" and before "are" insert -- 92, 94 --;.
Line 57, delete "have" and substitute -- has -- therefor;
Line 59, delete "are" and substitute -- is -- therefor;

Column 11,
Line 2, after "material" and before "as" insert -- 10, 26 --;
Lines 25-26, delete "sheets of material" and substitute therefor -- materials --;
Line 29, delete "have" and substitute -- has -- therefor;
Line 35, delete "have" and substitute -- has -- therefor;

Column 12,
Line 32, delete "14*j*(not shown)," and substitute therefor -- 14*j* (not shown), --,

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Column 13,
Line 14, delete "28*j*" and substitute -- 28*j*, -- therefor;
Line 23, delete "is" and substitute -- are -- therefor;
Line 3 5, after "material" and before "may" insert -- 10*j* --;
Line 41, delete "56*j*";
Line 62, delete "10*k*" and substitute -- 24*k* -- therefor;

Col. 17,
Line 12, delete "machine" and substitute therefor -- apparatus --;
Line 56, delete "machine" and substitute therefor -- apparatus --;
Line 58, delete "machine" and substitute therefor -- apparatus --;
Line 59, delete "machine" and substitute therefor -- apparatus --;

Column 18,
Line 2, delete "rolls" and substitute -- rollers -- therefor;
Line 6, delete "132 of the platform 130." and substitute -- 132*a* of the platform 130*a*. -- therefor;
Line 8, after "platform" and before "a", insert -- 130*a*, --;
Line 9, after "roll" and before "190" insert -- of material --;
Line 22, delete "version" and substitute therefor -- versions --;
Line 32, after "sheet" and before "214" insert -- of material --;
Line 39, delete "Fastening" and substitute therefor -- tying --;
Line 41, after "the" and before "mold" insert -- conveyable cover forming --;
Line 41, delete "fastening position" and substitute therefor -- tying area --;
Line 42, delete "fastening" and substitute therefor -- tying --;
Line 43, delete "fastening" and substitute therefor -- tying --;
Line 55, delete "132" and substitute therefor -- 130 --;
Line 61, delete "machine" and substitute therefor -- apparatus --;
Line 10, delete "machine" and substitute therefor -- apparatus --;
Line 15, delete "machine" and substitute therefor -- apparatus --;
Line 32, before "fastener" and after "may" insert -- 222*a* --; and

UNITED STATES PATENT AND TRADEMARK OFFICE
CERTIFICATE OF CORRECTION

PATENT NO. : 5,839,256
DATED : November 24, 1998
INVENTOR(S) : Donald E. Weder et al.

It is certified that error appears in the above-identified patent and that said Letters Patent is hereby corrected as shown below:

Column 19,
Line 4, delete "apparatus" and substitute therefor -- cover forming and fastening apparatus 126 --;
Line 6, after "opening" and before "to" insert -- 152 --;
Line 7, delete "apparatus" and substitute therefor -- cover forming and fastening apparatus 126 --;

Column 21,
Line 36 (line 3 of claim 17), delete "Peripheral" and substitute -- peripheral -- therefor, Signed and Sealed this Twenty-seventh Day of November, 2001

Attest:

*Attesting Officer*

NICHOLAS P. GODICI
*Acting Director of the United States Patent and Trademark Office*